(12) United States Patent
Hempy et al.

(10) Patent No.: US 12,258,256 B2
(45) Date of Patent: Mar. 25, 2025

(54) CONNECTED AND AUTOMATED LIQUID DISPENSING ATTACHMENT

(71) Applicant: Lab2Fab LLC, Fremont, CA (US)

(72) Inventors: Hogan Hall Hempy, Pleasanton, CA (US); Michael C. DeRenzi, Danville, CA (US); Ken Haven, Livermore, CA (US); Shawn Michael Lange, Walnut Creek, CA (US); Malonda Maxine McElwee, Emeryville, CA (US); Refugio Gonzalez Ponce, San Jose, CA (US); Krishna Rao, San Ramon, CA (US); Renata Jaye Puakea Smith, Oakland, CA (US); Chad Steese, Cherry Hills Village, CO (US); Robert Freeman Thompson, Aptos, CA (US); Naomi Kalia Williams Zabel, Oakland, CA (US)

(73) Assignee: Lab2Fab LLC, Fremont, CA (US)

(*) Notice: Subject to any disclaimer, the term of this patent is extended or adjusted under 35 U.S.C. 154(b) by 493 days.

(21) Appl. No.: 17/553,201

(22) Filed: Dec. 16, 2021

(65) Prior Publication Data

US 2022/0177292 A1    Jun. 9, 2022

Related U.S. Application Data

(63) Continuation of application No. 16/993,510, filed on Aug. 14, 2020, now Pat. No. 11,247,891.

(51) Int. Cl.
*B67D 1/00*     (2006.01)
*B05B 15/65*     (2018.01)
(Continued)

(52) U.S. Cl.
CPC ........... *B67D 1/0041* (2013.01); *B05B 15/65* (2018.02); *B67D 1/1234* (2013.01);
(Continued)

(58) Field of Classification Search
CPC .. G01F 15/0755; G01F 15/063; G01F 15/003; G01F 13/006; G01F 13/00;
(Continued)

(56) References Cited

U.S. PATENT DOCUMENTS 2,642,207 A    6/1953   Renzi
3,920,149 A * 11/1975   Fortino ............... B67D 3/0051
                                                                                 222/1
(Continued)

FOREIGN PATENT DOCUMENTS

CA          2848482 A1    10/2014
CA          2847719 C     5/2015
(Continued)

OTHER PUBLICATIONS

"Understanding APIs", Red Hat, Published Jun. 29, 2018 https://www.redhat.com/en/topics/api#:~:text=APIs%20are%20about%20integration%E2%80%94the,one%20another%20or%20anyone%20else's. (Year: 2018).

(Continued)

*Primary Examiner* — Xin Y Zhong
*Assistant Examiner* — Monica S Young
(74) *Attorney, Agent, or Firm* — Van Hoven PC; Joshua Van Hoven; Stefan D. Osterbur

(57) ABSTRACT

An automated liquid dispensing attachment monitors and controls preparation of drinks poured from bottles. The automated liquid dispensing attachment attaches to a bottle and senses multiple aspects of the pouring of the drink, and based on the sensor outputs, monitors and controls the flow of fluids from the bottle through the attachment. The automated liquid dispensing attachment communicates with other electronic devices to enable individualized control and monitoring, and data aggregation and analysis.

22 Claims, 14 Drawing Sheets

(51) Int. Cl.
| | |
|---|---|
| *B67D 1/12* | (2006.01) |
| *B67D 3/00* | (2006.01) |
| *G01F 1/002* | (2022.01) |
| *G01F 1/56* | (2006.01) |
| *G01F 15/063* | (2022.01) |
| *G01F 15/075* | (2006.01) |

(52) U.S. Cl.
CPC ......... *B67D 1/1247* (2013.01); *B67D 3/0041* (2013.01); *B67D 3/0051* (2013.01); *B67D 3/0077* (2013.01); *G01F 1/002* (2013.01); *G01F 1/56* (2013.01); *G01F 15/063* (2013.01); *G01F 15/0755* (2013.01)

(58) Field of Classification Search
CPC . G01F 1/56; G01F 1/002; B67D 2210/00091; B67D 3/0077; B67D 3/0051; B67D 3/0041; B67D 1/1247; B67D 1/1234; B67D 3/0003; B67D 1/0041; B05B 15/65
USPC .......................................................... 73/861
See application file for complete search history.

(56) References Cited

U.S. PATENT DOCUMENTS

| | | | |
|---|---|---|---|
| 4,736,871 A | 4/1988 | Luciani et al. | |
| 4,877,066 A | 10/1989 | Okamizu | |
| 5,255,819 A | 10/1993 | Peckels | |
| 5,318,197 A | 6/1994 | Martindale et al. | |
| 5,921,170 A | 7/1999 | Khatchadourian et al. | |
| 6,354,468 B1 | 3/2002 | Riek | |
| 6,526,874 B1 | 3/2003 | Khatchadourian et al. | |
| 6,892,166 B2 | 5/2005 | Mogadam | |
| 7,448,418 B1 | 11/2008 | Tuyls | |
| 7,900,799 B2 | 3/2011 | Kuzar et al. | |
| 8,695,858 B2 | 4/2014 | Zapp | |
| 8,710,408 B2 | 4/2014 | Khatchadourian et al. | |
| 8,869,847 B2 | 10/2014 | Browne-Wilkinson | |
| 8,925,769 B2 | 1/2015 | Zapp et al. | |
| 9,004,320 B2 | 4/2015 | Keating et al. | |
| 9,022,257 B2 | 5/2015 | Keating et al. | |
| 9,212,041 B2 | 12/2015 | Keating et al. | |
| 9,428,374 B2 | 8/2016 | Houck et al. | |
| 9,533,870 B2 | 1/2017 | Zapp | |
| 9,555,936 B2 | 1/2017 | Martindale et al. | |
| 9,586,802 B2 | 3/2017 | Tuyls et al. | |
| 9,718,665 B2 | 8/2017 | Wittrup et al. | |
| 9,821,997 B2 | 11/2017 | Zapp | |
| 9,975,752 B2 | 5/2018 | Keating et al. | |
| 10,031,505 B2 | 7/2018 | Martindale et al. | |
| 10,072,964 B2 | 9/2018 | Gurumohan et al. | |
| 10,077,181 B2 | 9/2018 | Tuyls et al. | |
| 10,155,651 B2 | 12/2018 | Keating et al. | |
| 10,267,667 B2 | 4/2019 | Gurumohan et al. | |
| 10,324,075 B2 | 6/2019 | Gurumohan et al. | |
| 10,591,345 B2 | 3/2020 | Gurumohan et al. | |
| 10,689,242 B2 | 6/2020 | Keating et al. | |
| 2004/0210405 A1* | 10/2004 | Mogadam ............ | B67D 3/0054 702/50 |
| 2005/0194402 A1 | 9/2005 | Morrison | |
| 2006/0027268 A1 | 2/2006 | Zapp | |
| 2008/0178749 A1 | 7/2008 | Stutman | |
| 2009/0230157 A1* | 9/2009 | Lindberg ............. | B67D 3/0051 222/504 |
| 2009/0277931 A1* | 11/2009 | Zapp ................... | B67D 3/0006 222/504 |
| 2010/0038378 A1 | 2/2010 | Gabler et al. | |
| 2011/0036873 A1 | 2/2011 | Peckels | |
| 2011/0059209 A1 | 3/2011 | Khatchadourian | |
| 2011/0309103 A1 | 12/2011 | Heatherly et al. | |
| 2012/0185086 A1 | 7/2012 | Khatchadourian et al. | |
| 2012/0211516 A1* | 8/2012 | Zapp ..................... | G01F 15/075 222/26 |
| 2012/0308702 A1 | 12/2012 | Khatchadourian et al. | |
| 2014/0034686 A1* | 2/2014 | Guerette .............. | B67D 3/0041 222/504 |
| 2014/0144935 A1 | 5/2014 | Okeefe et al. | |
| 2014/0263418 A1* | 9/2014 | Keating ................ | G07F 13/065 222/39 |
| 2015/0053097 A1 | 2/2015 | Vardakostas et al. | |
| 2016/0023804 A1* | 1/2016 | Tuyls ..................... | B65D 47/06 222/573 |
| 2016/0096717 A1 | 4/2016 | Keating et al. | |
| 2016/0198246 A1 | 7/2016 | Gurumohan et al. | |
| 2017/0024789 A1 | 1/2017 | Frehn et al. | |
| 2017/0043995 A1 | 2/2017 | Reichelt et al. | |
| 2017/0121063 A1 | 5/2017 | Ledun et al. | |
| 2017/0174496 A1 | 6/2017 | Gold et al. | |
| 2017/0290345 A1 | 10/2017 | Garden et al. | |
| 2018/0265344 A1 | 9/2018 | Keating et al. | |
| 2018/0330315 A1* | 11/2018 | Gurumohan .......... | H04W 76/14 |
| 2019/0025108 A1 | 1/2019 | Jones | |
| 2019/0125126 A1 | 5/2019 | Cohen | |
| 2019/0216266 A1 | 7/2019 | Ganninger | |
| 2020/0095111 A1 | 3/2020 | Lorkowski | |
| 2020/0143316 A1* | 5/2020 | Anido ................... | G01F 11/265 |
| 2020/0189837 A1 | 6/2020 | Keating et al. | |
| 2020/0247661 A1 | 8/2020 | Rao et al. | |
| 2020/0249660 A1 | 8/2020 | Rao et al. | |
| 2021/0009399 A1 | 1/2021 | Lambrecht et al. | |
| 2021/0403310 A1* | 12/2021 | Lindberg ............. | B67D 3/0041 |
| 2022/0026256 A1* | 1/2022 | Ho ........................ | G01F 23/268 |
| 2022/0048752 A1 | 2/2022 | Hempy et al. | |
| 2024/0148326 A1* | 5/2024 | Monti .................. | H04R 25/603 |

FOREIGN PATENT DOCUMENTS

| | | | | |
|---|---|---|---|---|
| CA | 2898531 A1 | 1/2016 | | |
| CA | 2846671 C | 7/2016 | | |
| EP | 2134183 A1 | 12/2009 | | |
| TW | 201740340 A | 11/2017 | | |
| WO | 2012099969 A1 | 7/2012 | | |
| WO | WO-2014164017 A1 * | 10/2014 | .......... | B67D 3/0003 |
| WO | 2018165105 A1 | 9/2018 | | |
| WO | WO-2020070241 A1 * | 4/2020 | .......... | B67D 3/0003 |

OTHER PUBLICATIONS

International Search Report and Written Opinion received for PCT Patent Application No. PCT/US2021/045402, mailed on Nov. 24, 2021, 14 pages.
The Editors of Encyclopedia Britannica, "Data structure", Britannica Jan. 2, 2018 https://web.archive.org/web/20180102152326/https://www.britannica.com/technology/data-structure (Year: 2018).
"SKYFLO (TM) Wireless Bar Control", https://web.archive.org/web/20180816102006if_http://kipflo.com/img/Brochure%20-%20Skyflo%20Products.pdf, 8 pages, Aug. 16, 2018.
"Skyflo Brings Latest Technology to Bar P&L While Respecting On-Premise Culture", https://totalfood.com/skyflo-brings-latest-technology-bar-onpremise-culture, 4 pages, Sep. 20, 2018.
International Search Report and Written Opinion in PCT/US2020/016437 dated May 27, 2020.
International Search Report and Written Opinion in PCT/US2020/016439 dated May 27, 2020.
Nicola La Gloria, "CloudFlo—The Next Generation Liquor Dispensing System Featuring Java Embedded", https://docs.huihoo.com/javaone/2012/CON11072-Liquor-Dispensing-and-Management-Systems-Featuring-Java-SE-7-Embedded.pdf, 33 pages, Dec. 30, 2012.
SEVideo Primary, Automatic-Pizzeria (video). Accessible at https://www.automatic-pizzeria.com/, accessed Sep. 14, 2020 (screenshot of initial video noting URL is attached).

* cited by examiner

CONNECTED AND AUTOMATED LIQUID DISPENSING ATTACHMENT

CROSS-REFERENCE TO RELATED APPLICATION

This application is a continuation of U.S. application Ser. No. 16/993,510, which was filed Aug. 14, 2020, which is hereby incorporated by reference herein in its entirety.

BACKGROUND

In the drink serving industry, it is important to be able to understand the drinks served to customers. For example, monitoring drink types and volume consumed over time assists in managing profitability, inventory, and various other aspects of operations of an establishment. In conventional systems, a server (e.g., a bartender) pours drinks based on customer's requests and controls the entire process of pouring the drink and tracking the transaction, for example, pouring shots of distilled spirit and other liquids into a mixed drink. In most conventional systems, the bartender employs a counting method or some other form of estimation. However, these manual methods do not necessarily make a consistent drink, because of over pouring or under pouring, thereby decreasing the quality of the drink, and producing a drink that makes the customer disappointed. This is particularly problematic with new employees. In other circumstances, the bartender may pour different volumes of drinks for different customers, such as friends, resulting in inconsistency and often at the cost of profitability for the business owner. In these conventional systems, the business owner is harmed by a decreasing profit margin and management overhead required to keep pouring consistent and honest.

A few systems employ bottle attachments that attempt to provide automated pouring volumes and/or measurement of pouring by bartenders. Some mechanical pourers set an upper limit on an amount of a pour, which in some instances can be adjusted. Such systems do not necessarily present underpours, or extra top offs from multiple pours. Electromechanical pourers may employ an activation and selection button that requires the user to press the button to actuate the pouring device manually. The user can adjust the size of the drink, for example, from a half a shot to double shot. Even these partially automated methods require significant effort on the part of the bar owner or manager, and even with that effort, provide a limited ability to manage, monitor, and control losses proactively. Even with such liquid dispensing systems, there are still significant opportunities for loss and theft, such as repeated pours and accidental pours. Also, with one of the highest turnovers in the industry, these methods require significant training of the bar staff every time a trained member leaves and a new member joins the team, as well as ongoing refreshers and reminders to ensure that rules that are implemented are adhered to overtime. Existing liquid dispensing devices lack the necessary embedded monitoring, control, and communication hardware for automating, simplifying, and analyzing operations.

SUMMARY OF THE INVENTION

In an embodiment of the present disclosure, an automated liquid dispensing attachment comprises an attachment portion configured to engage with an interior surface of a container. The attachment portion comprises a fluid sensor. A housing is coupled to the attachment portion and configured to be located outside of the container when the attachment portion is engaged with the interior surface of the container. A spout extends from the housing and a fluid passage is connected to the spout and extending through the attachment portion and the housing. The attachment sensor may be configured to output an attachment signal based on the engagement of the attachment portion with the interior surface of the container, and the fluid sensor may be located proximate to a portion of the fluid passage and configured to output a fluid signal based on a liquid within the portion of the fluid passage. A fluid control device may be coupled to the fluid passage to selectively permit fluid to pass through the fluid passage to the opening of the spout, and processing circuitry may be coupled to receive the attachment signal and the fluid signal, wherein the processing circuitry is configured to control the fluid control device based on the attachment signal or the fluid signal.

In an embodiment of the present disclosure, a method for dispensing a volume of fluid from an automated liquid dispensing attachment may comprise receiving, from a fluid sensor located proximate to a portion of a fluid passage of the automated liquid dispensing attachment, a fluid signal based on a liquid within the portion of the fluid passage. The method may further comprise receiving, from an attachment sensor located adjacent to an exterior surface of the automated liquid dispensing attachment that engages with an interior surface of a container, an attachment signal based on the engagement of the exterior surface with the interior surface of the container. The method may further comprise opening, by a fluid control device, a fluid passage of the automated liquid dispensing attachment based on the attachment signal or the fluid signal to dispense the volume of the fluid.

In an embodiment of the present disclosure, an automated liquid dispensing attachment may comprise an attachment sensor configured to output an attachment signal based on an engagement of a portion of the automated liquid dispensing attachment with an interior surface of a container, a fluid sensor positioned proximate to a portion of a fluid passage and configured to output a fluid signal based on a liquid within the portion of the fluid passage, a fluid control device coupled to the fluid passage to selectively permit fluid to pass through the fluid passage to the opening of the spout, and processing circuitry coupled to receive the attachment signal and the fluid signal, wherein the processing circuitry is configured to control the fluid control device based on the attachment signal and the fluid signal.

BRIEF DESCRIPTION OF THE FIGURES

The above and other features of the present disclosure, its nature and various advantages will be more apparent upon consideration of the following detailed description, taken in conjunction with the accompanying drawings in which.

DESCRIPTION

In accordance with the present disclosure, establishments such as bars and restaurants are equipped with automated liquid dispensing attachments that attach to bottles (e.g., liquor bottles, wine bottles, etc.) and that manage, control, report, and measure the dispensing of beverages within the establishment. For example, an establishment may have dozens or even hundreds of automated liquid dispensing attachments that are attached to bottles that are presently is use by the establishment. The automated liquid dispensing attachments can have a compact form factor and features to allow for the simple attachment to bottles, while accommodating features such as sensors, user interfaces, and communications circuitry. The design and configuration of the automated liquid dispensing devices may be such that they have a relatively long lifespan to allow repeated attachment as bottles are used and replaced with new bottles. In some embodiments, portions of the automated liquid dispensing attachments such as the attachment portion that comes in contact with the bottle may be configured for more frequent replacement.

The automated liquid dispensing attachments may include a variety of features to ensure the safe, efficient, and effective pouring of beverages. Attachment sensors may confirm that the automated liquid dispensing attachment is in fact properly attached to a bottle, preventing accidents involving loss of valuable inventory, injury, or damage to the automated liquid dispensing attachment itself. Fluid sensors may sense the presence and/or flow of liquid within the automated liquid dispensing attachment. Other sensors such as motion sensors and environmental sensors can also be utilized, such as to control pours, provide safety features, and monitor for preventative maintenance or spoilage. These sensors are used to actuate and control the dispensing of liquid, as well as to measure various aspects of the liquid dispensing attachment's operations and operating environment.

A communications interface provides for the control of the automated liquid dispensing attachment as well as collection and reporting of data. The system may be controlled to allow pours only under particular circumstances, for example, in the presence of particular employees or after an order has been properly entered into a point of sale ("POS") system. User interface features may allow direct inputs from the user to control pouring, as well as providing instructions for pouring (e.g., amount, order of pouring, etc.) to the user. Once a pour is authorized based on these various inputs and measurements, a fluid control device such as an actuator for a pinch tube may allow the fluid to flow until a predetermined amount of fluid has been dispensed or the pour is otherwise complete (e.g., based on a measure pour amount, a shutoff event determined by sensors, etc.), after which the fluid control device can again shut off the flow of fluid.

Figure 1:
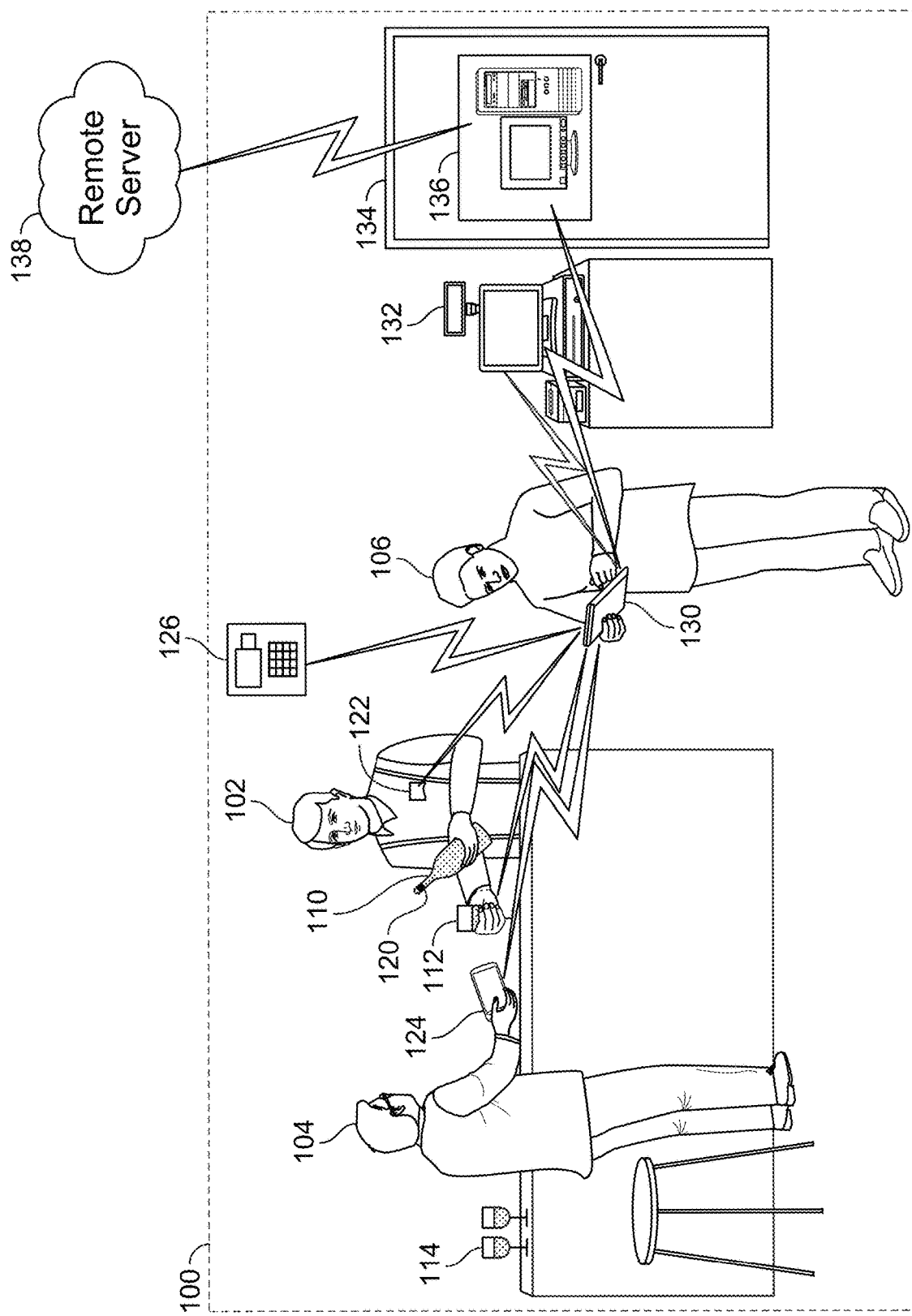
FIG. 1 depicts an exemplary establishment including automated liquid dispensing attachments and other supporting hardware and software of an automated liquid dispensing control system, in accordance with some embodiments of the present disclosure.

FIG. 1 depicts an exemplary establishment including automated liquid dispensing attachments and other supporting hardware and software of a beverage control system in accordance with some embodiments of the present disclosure. Exemplary liquid dispensing attachments and a monitoring and control system is described in U.S. patent application Ser. No. 16/780,793, entitled "Beverage Dispensing and Monitoring System" and filed on Feb. 3, 2020, which is hereby incorporated by reference herein in its entirety for all purposes. Although it will be understood that components described herein with respect to FIG. 1 may be added, removed, or replaced, in an exemplary embodiment the beverage control system of the establishment includes a plurality of automated liquid dispensing attachments 120, a permitted customer device 124, an employee tag 122, other sensors 126, a point-of-sale system 132, a gateway device 130, a fog (e.g., edge) device 136, and a remote cloud server 138.

The automated liquid dispensing attachments 120 may provide monitoring of information about bottles 110 and pours of drinks 112 and 114 (e.g., including a number of pours, amount of pour, flow rate, the volume of liquid in a bottle, liquid characteristics, liquid temperature, lock/unlock, pour device types, pour device IDs, beverage types, beverage IDs, binary indicators whether a pour was complete, etc.) as well as additional information about the environment (e.g., temperature, pressure, humidity, employee access attempts, etc.) and may communicate that information to a gateway 130 and/or fog device 136. An employee tag 122 may directly or indirectly communicate with the automated liquid dispensing attachment 120 (e.g., to permit the flow of fluid, associate the employee with particular automated liquid dispensing attachments, authorize modifications to settings, etc.) and/or with the gateway 130, POS system 132, and/or fog device 136 (e.g., providing location, on-the-clock information, or select employee inputs). A user device 124 may permit access to certain functionality, for example, via an application associated with the establishment, entity, or an operator of the beverage control system. The user device 124 may communicate with the gateway 130, POS system 132, and/or fog device 136, providing information such as user preferences, user orders, coupons, demographic information, age, etc. Other sensors 126 may include a variety of suitable sensors, such as a camera (e.g., video or time-of-flight) that captures images and/or identifies locations of employees (e.g., via a beacon of an employee tag), customers, and automated liquid dispensing attachments (e.g., via a beacon associated with the automated liquid dispensing attachments), and communicates the other sensor data to a gateway and/or fog device. In some embodiments, sensors may be included within glasses or other receptacles used for drinks, for example, to sense proximity to an approved liquid dispensing attachment for pouring, to provide a signal sensed by a liquid dispensing attachment or employee tag, to sense the presence of a liquid, and/or to sense other parameters such as motion or temperature. A POS system 132 may also communicate with the gateway 130 and/or fog device 136, and may provide order, pricing, customer, payment and other POS information to the gateway 130 and/or fog device 136.

In some embodiments, aspects of the system may be automated, for example, including automated fulfillment of inventory, preparation of food, and pouring of drinks. This automation in some embodiments may include robots that perform some functions typically performed by foodservice employees, such as taking orders, pouring drinks, preparing food, serving food, etc. Equipment within the establishment, inventory systems, etc., may be equipped with processing and communication equipment that allows the exchange of information with the gateway and/or fog device. Information may be monitored, and requests (e.g., build and cook a hamburger, prepare a cup of coffee with cream, deliver a bottle of wine from inventory) may be transmitted from the gateway and/or fog device to any such automated equipment.

In some embodiments, the operations of the establishment are monitored by authorized users (e.g., a manager 106) with a gateway device or devices 130 (e.g., tablets, mobile devices, POS system, personal computer, etc.). The gateway device 130 and fog device 136 are communicatively linked to, e.g., each other, such that the fog device 136 can store and analyze data to be transmitted to a remote server 138 (e.g., the cloud). This communication system may further allow the manager to monitor and analyze data collected at other bars that are linked to this network via the remote server. In some embodiments, the gateway device 130, fog device 136, and/or cloud 138 may access other information, such as crowd information, promotions, inventory, supplier data, weather, events, satellite data, geolocation data, inventory data, delivery/warehouse data, social media data, etc. The data collected at any of the devices and available from third-party sources may be structured or unstructured data, and in some embodiments, may be normalized into common formats (e.g., for use as data primitives).

In some embodiments, as the data is collected, the data is sorted and stored in databases locally in a fog device 136. The data may then be sent to a cloud server 138. The database can have multiple tables, each of which can concentrate on one type of entity with detailed attributes for that entity. For example, a "pour" table may focus on data such as pour volume, time of pour, pour completion indicators, etc. New entities can be added when new information, features, types, etc., become available. New information may include new beverage pouring devices, beverages, bars, drink recipes, etc.

In one embodiment, a manager 106 may be on-site monitoring the establishment. The manager 106 may have a bartender or other employee 102 who is pouring a customer 104 a drink 112 (e.g., a mixed drink). The bottle 110 (e.g., a bottle of a particular spirit) that the bartender 102 is pouring from may be equipped with an automated liquid dispensing attachment 120 that monitors the liquid being poured from the bottle 110 as well as other information about the pour, bottle 110, liquid or environment. The automated liquid dispensing attachment 120 may be equipped with various sensors, processors, memory, and/or a communication chip to be able to respond to control instructions, initiated and measure a pour, determine the volume poured, store the data, and/or transmit the data to another device (e.g., to a gateway device 130), as described herein.

Once a bartender 102 has finished pouring the volume corresponding to the amount both that the customer 104 has asked for and that will be recorded by the POS system, the bartender may return the bottle 110 to the bar shelves (e.g., which may be confirmed based on local sensors such as proximity sensors, wireless signal strength measurements, etc.). The manager 106 may see the volume poured as a data point displayed on a gateway device 130 showing a chart of volume pours by time and beverage type or brand. The bartender 102 may also decide to give the customer 104 extra drinks as a favor or may accidentally spill the particular spirit as he pours it, due to inexperience. In some embodiments, automated features of the automated liquid dispensing attachments may prevent or limit such overpours or spills, as described herein. The manager 106 can likewise see the amount of particular spirits poured displayed on a gateway device 130.

As the gateway device 130 receives data from the automated liquid dispensing attachments 120 at the bar, the gateway device may store the data locally or transmit the data to a fog device 136 for storage or processing. An exemplary fog device 136 may be a desktop computer located at an office within the bar 134. The fog device 136 may be able to perform more intensive analysis with the data collected due to its larger storage space or higher processing speed. For example, the fog device 136 may receive instructions from the gateway device 130 to perform analysis upon a specific subset of data it has stored (e.g., to analyze the amount of low-calorie beer poured each day during the past 30 days). The fog device 136 may also communicate with a cloud server 138 to store data or to process data remotely. When the data has been processed to achieve the desired analysis, the fog device 136 may send the results back to the gateway device 130 for display.

In some embodiments, aspects of the operations of the automated liquid dispensing attachments 120 may be controlled by a gateway device 130. In some embodiments, the gateway device 130, fog device 136, or cloud 138 may perform analytics that facilitate control of the operation of the automated liquid dispensing attachments 120. For example, parameters such as the amount of pour, particular liquors used in a drink, recommended drinks, selection of well drinks, limitations on drinks to pour or consume by employees and customers and other related parameters may be determined based on information acquired by the system. For example, the cloud system 138 may identify that a particular brand has low local inventory and may temporarily enact measures to limit the consumption of that brand, such as suggesting substitutes for mixed drinks and sending control signals that activate a user interface (e.g., LED lights) of the substitute drink to suggest and/or pour for the customer. The analytics system may also provide information to facilitate the relative consumption of particular brands, for example, based on bulk purchase incentives or promotions for the entity, such as providing specials necessary to achieve attainment of the incentives or promotions or to exhaust an excessive inventory. Similarly, analytics can provide for selective enabling or disabling of access to certain beverages based on events or known situations (e.g., time of day, consumption patterns for an evening, etc.) that have an enhanced risk of undesirable conditions such as violence and/or property damage.

In an exemplary embodiment, the gateway device 130 may provide a centralized system for controlling the entire beverage control system. For example, patterns can be monitored based on employee 102, mixed drink type, brand type, glass or other container, per bottle, and (if permission is given) customer 104. Analysis with historical data and other current data (e.g., from other establishments, other data sources, promotional information, inventory and delivery data, etc.) can be used to determine drink prices, specials, recipes, and the like. In some embodiments, an employee 102 may be required to input a drink into the POS system 132 (e.g., one or more central POS systems and/or employee POS devices) or a POS extension (e.g., a local wireless device, a local A/R device, a voice input, interaction with the user interface of the automated liquid dispensing device, etc.) before accessing a bottle 110. The gateway 130 may process the request based on the current recommendations and may dynamically select the bottles that are used to satisfy a particular drink request (e.g., to select which bottles to use for a margarita). Particularized user requests may result in specials or offers for other drinks being provided to the user 104. In any event, once a particular drink is selected, the automated liquid dispensing attachments 120 associated with the appropriate bottles 110 may be activated. In some embodiments, the bottles may provide an indicator to assist the employee 102 with the pour, such as by activating a LED in a color associated with the employee 102. If it is desirable to pour the bottles 110 in a particular order, this information may also be indicated on the automated liquid dispensing attachments 120 (e.g., based on or a mobile device 124 associated with the user 104. In some embodiments, such information may be relayed to the employee 102 by other means, such as on an augmented reality ("A/R") device (e.g., overlying the employee's view of the bar with visual indicators, which may be associated with automated liquid dispensing attachments 120 such as by beacons), auxiliary displays located at strategic locations, and/or the LED lights position on the automated liquid dispensing attachments 120, which may illuminate a certain color. During the pour, the automated liquid dispensing attachment 120 may automatically pour the correct amount for the selected drink 112.

In exemplary embodiments, a beverage control system may operate at the level of a single establishment, an entity having multiple establishments, or across an entire industry. Entity-level and industry-level operations may be supported by connecting local monitoring and control information for an establishment to the cloud (e.g., via the internet). As described herein, the establishment may collect data from numerous other sources in addition to automatic liquid dispensing attachments, such as local sensors (e.g., video, audio, time-of-flight, inventory monitoring, etc.) and from other connected devices (e.g., of employees and customers). This information may be collected locally at the establishment and portions of the analysis and operational controls may be handled at the establishment by a gateway and/or fog device.

Entity-level information may be gathered from multiple establishments associated with the entity, while industry-level information may be gathered from multiple entities within a shared industry (e.g., concert venues, sports venues, nightclubs, pubs, casual eateries, etc.). Entity-level and industry-level information may also be gathered from data sources other than the establishments, for example, based on beverage supplier data (e.g., drink inventory, prices, time-to-delivery, supply auctions, etc.), third-party data suppliers (e.g., trade organizations, proprietary data sources), and other information that may be relevant to beverage usage, consumption, theft, and operations (e.g., promotions, events, venue information, performer information, human movement and commute patterns, social media data, etc.).

Different information at different levels of the analysis stack may be selectively transmitted, encrypted, anonymized, obscured, deleted, monitored, analyzed, and/or controlled in different circumstances. For example, only some monitored data (e.g., analysis, reports, removal of personal identifying information, etc.) may be provided from the establishment to the entity, and similarly, the entity may limit the types of information that are provided to the industry-level system. Communications may similarly be limited or modified within the establishment, for example, to prevent association with particular employees or customers. Information transmitted to and from the automated liquid dispensing attachments 120 may be encrypted or obscured to limit the possibility that personal information or other information such as financially valuable information is intercepted (e.g., encrypting drink "recipe" transmissions within the network, or preventing third-party snooping on consumption of particular beverages).

In some embodiments, the automated liquid dispensing attachments 120 and supporting hardware and service can be provided as a service (e.g., such that the establishment or entity is not required to make a significant capital investment to employ the beverage control system). In such a system, fees and/or credits may be based on a flat fee or may be selected based on amount poured, functionality utilized, analytics provided, promotions, etc. In some embodiments, pricing may be dynamic based on these factors, for example, to facilitate reduced pricing if a volume of certain beverages is poured, breakdown rate, quality of care and preventative maintenance, identified incidents of theft or fraud, etc.

Although the present disclosure will be described in the context of dispensing liquids for use in drinks such as in a bar or restaurant environment, it will be understood that the present disclosure may apply to other liquids used in the food service industry, as well as outside of the food service industry, for example, in industrial environments. For example, attachment portions of automated liquid dispensing attachments may be sized to interface with a variety of bottle and container openings, for example, for liquids used in cooking and food service such as oils, dairy, vinegars, condiments (e.g., soy sauce), etc. Similarly, industrial fluids may be controlled, monitored, and dispensed using automated liquid dispensing attachments as described herein, for example, by replacing food grade materials with robust and non-corrosive industrial materials.

Figure 2:
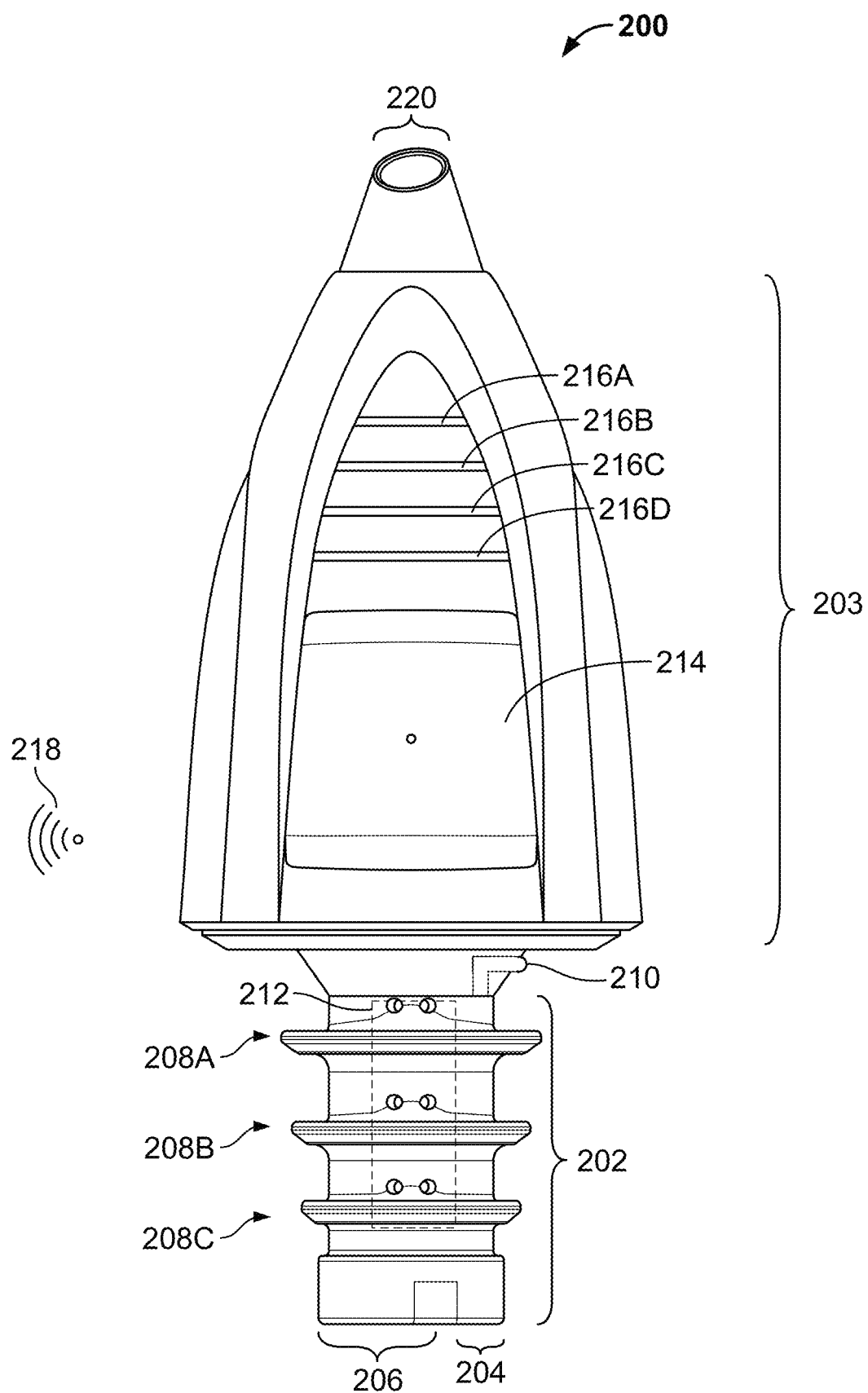
FIG. 2 depicts an exemplary automated liquid dispensing attachment, in accordance with some embodiments of the present disclosure.

FIG. 2 depicts an exemplary automated liquid dispensing attachment in accordance with some embodiments of the present disclosure. An automatic liquid dispensing system may include multiple automated liquid dispensing attachments including monitoring, control, communication, and user interface features.

An exemplary automated liquid dispensing attachment 200 may include an attachment portion 202 for engagement with an interior surface (e.g., by applying pressure such as by frictional engagement with a cylindrical or other interior surface) of a bottle or other container, a dome 203 for providing user interface features and housing internal components of the automated liquid dispensing attachment, and a spout 220 for pouring liquid that passes through internal components of the attachment portion 202 and dome 203. During pouring of a drink, fluid travels from the bottom of the attachment portion 202 through the dome 203 and exits the automated liquid dispensing attachment via the spout 220. Although particular components are depicted in FIG. 2 for a particular automated liquid dispensing attachment 200, it will be understood that some of the components may be modified, removed, or replaced, and that the order of certain operations may be modified while retaining automatic liquid dispensing feature described herein. Although not depicted in FIG. 2, in some embodiments, an insert, for frictional engagement with an interior surface of the larger bottle opening, may be seated on the exterior of the attachment portion and may be automatically or selectively expandable to match the interior surface of larger or differently shaped bottle openings. For example, an insert (not depicted) may be shaped to wrap around the external surface of the attachment portion 202 to accommodate different bottle opening shapes, while providing appropriate interaction with the active features of the attachment portion (e.g., by appropriate engagement to cause compression of the attachment ribs 208A-208C and associated sensors).

An upper portion of the attachment portion 202 connects to a lower portion of the dome 203, and in upper portion of the dome 203 attaches to the spout 220 drinks. The attachment portion 202 may include a plurality of attachment components 208A-C (e.g., attachment ribs) circumferentially positioned on the exterior surface of the attachment portion 202. The attachment ribs 208A-C may be a suitably material such as a food grade silicone (e.g., having a suitable durometer, such as 60a) to interface with components for sensing the attachment to the bottle (e.g., when the attachment ribs are compressed by engagement with an interior surface of a bottle), such as snap domes that are located under the attachment ribs and that are at least partially compressed by a force applied to the attachment ribs by the bottle. The attachment ribs 208A-C are configured to engage with the interior surface of the opening of the bottle and when a force is applied, e.g., when attachment portion 202 is engaged in the bottle opening, the attachment ribs may actuate one or more attachment sensors 212 (e.g., snap domes, an embedded strain gauge, an embedded carbon pill embedded in a silicon membrane, and/or a tactile switch). In some embodiments, an attachment portion 202 may provide for multiple attachment ribs, such as a first attachment rib 208A, a second attachment rib 208B and a third attachment rib 208C, for engaging with an upper opening of the bottle.

Although the attachment ribs may be configured a variety of shapes (e.g., a corresponding exterior rib profile to match suitable interior bottle shapes), in an exemplary embodiment the attachment ribs may be upwardly tapered and include increasing diameters (e.g., such that the diameter of the first rib to contact the bottle is smallest, with increasing diameters for upwardly located additional ribs) to facilitate the insertion of the attachment portion 202 into the bottle. Additional features, such as rib thickness, durometer values, and number of ribs may be adjusted for desired insertion and removal characteristics. In the exemplary embodiment of attachment ribs 208A-208C, the interior surface of the bottle exerts a compressive force on the attachment ribs 208A-208C, which in turn can be sensed by sensors 212 such as snap domes (not depicted in FIG. 2) in contact with the interior surface of the attachment ribs. In an exemplary embodiment of snap domes, the snap domes may be positioned under the surface of the attachment ribs and may include rigid portions, such that when the attachment portion is inserted into the upper opening of the bottle, the attachment ribs 208A-208C may compress and a respective snap dome associated with each of the respective attachment ribs engages. The one or more attachment sensors 212, upon engagement (e.g., movement of one or more of the snap domes associated with attachment ribs 208A-C), transmits one or more signal to the processing circuitry of the liquid dispensing attachment, indicating that all or a portion of the attachment portion 202 is engaged with an inner surface of a bottle (e.g., based on a proportion of the attachment sensors that sense attachment to the bottle and/or the degree of engagement).

The exemplary automated liquid dispensing attachment 200 may further include a breather tube inlet 204 at the bottom of the attachment portion 202 providing a passage for air from a breather tube outlet 210 positioned below the dome 203, to a breather tube (not depicted in FIG. 2) that is inserted into the breather tube inlet 204. The breather tube inlet 204 and corresponding air passage is positioned adjacent the flow tube inlet 206 and corresponding liquid flow tube, such that air is able to travel through the attachment portion 202 to the breather tube outlet 210. A breather tube provides an air inlet that equalizes pressure in the bottle while liquid is poured out of the bottle. The flow tube inlet 206 is positioned at a first end of a flow tube at the bottom of the attachment portion 202 and extends via one or more components to provide a fluid passage to the spout 220 at the top of the automated liquid dispensing attachment 200. The flow tube is selectively controlled to permit fluid to pass via the flow tube inlet 206 from the bottle and exit via the spout 220, as described herein.

In some embodiments, while pouring liquid using the automated liquid dispensing attachment 200, flow tube 206 permits for fluid to exit the bottle to the interior components of the liquid dispensing attachment and the breather tube 204 provides an air passage that equalizes pressure and displaces the fluid flowing out of the bottle. By employing the breather tube 204 and flow tube 206, the automated liquid dispensing attachment 200 permits for laminar flow of liquid through the flow tube 206 to the spout 220 via the internal fluid passage, by avoiding a pressure differential between the interior volume of the bottle and the external atmosphere. In the absence of a breather tube or other means of equalizing pressure, a negative pressure will form (e.g., creating a vacuum) pulling air in via the spout (when the fluid path is open) and interrupting the laminar flow.

In some embodiments, the dome 203 of the automated liquid dispensing attachment 200 may include user interface features, such as LED light guides 216A-D and a user input button 214. Although user interface features of LED light guides and a user input button may be described herein, it will be understood that other user interface methods and hardware may be utilized in accordance with the present disclosure. For example, user interface features may be provided by visual, sound, and/or touch and haptic methods. In some embodiments, portions of the user interface may be provided on ancillary devices in communication with the automated liquid dispensing device, such as an augmented reality headset.

The light guides 216A-D may be aligned on a side of the dome 203. The light guides 216A-D may facilitate light to travel from the LED lights (not shown) disposed at another location within the dome 203 (e.g., on an adjacent flexible printed circuit board, not shown), and provide an interface for the user. The light guides and LEDs may provide a number of light patterns and colors to provide particular messages to the user. In an exemplary embodiment of four light guides as depicted in FIG. 2, the light guides 216A-D may include a first light guide 216A, a second light guide 216B, a third light guide 216C and a fourth light guide 216D aligned parallel to each other on the dome 203.

The automated liquid dispensing attachment 200 may include a user interface feature via the light guides 216A-D, collectively the first light guide 216A, the first light guide 216B, the third light guide 216C, and the fourth light guide 216D, to provide information to users, for example, via patterns and colors of LED lighting. Each of the light guides may include portions that are selectively activated, including with different colors, to provide dozens or hundreds of options for "messages" that can be conveyed via the light guides.

User interface features may be provided by the light guides 216A-D in combination with other user interface and/or communication techniques, such as mini displays, haptic interfaces, embedded speakers, local communication interfaces (e.g., Bluetooth Low Energy, WiFi, NFC, etc.), or suitable combinations thereof. User interface features such as light guides 216A-D may provide a variety of information, such as, an indication that a pour is complete or almost complete, an alert that a bottle needs to be changed, an alert for a pour error, an indication that a bottle should be selected for a pour, an indication that a bottle is one of a number of possible bottles to prepare a drink, an identifier for a brand or type of drink, and other suitable information and combinations thereof.

An exemplary user interface feature such as a user input button 214 allows the user to provide information (e.g., such as a request to pour liquid) to circuitry of the automated liquid dispensing device 200. Other user and/or communication interfaces may also provide the ability to receive information from other sources, such via inputs from local users on other devices, local sensor data, voice inputs, motion (e.g., particular motion profiles sensed by accelerometers and/or gyroscopes), and local communication interfaces (e.g., with a user tag or mobile device via Bluetooth Low Energy, NFC, etc.). Employees may provide information, such as beverage selection, pour amounts, user identification, settings modification, requests to unlock a beverage container, overrides, drink selection, and other suitable function and combinations thereof via such interfaces. The user interface features (e.g., light guides 216A-D and user input 214) may also facilitate associating the automated liquid dispensing attachment 200 with a particular type of drink (e.g., a brand and bottle size of wine or liquor). In another example, the light guides 216A-D may provide a color scheme based on light colors, patterns, flashing, or any other suitable identifier, or any combination thereof to alert the bartender to find the bottle faster, in a particular order, etc. In some embodiments, certain colors, patterns, flashing, or any other suitable identifier, or any combination thereof illuminated by the light guides 216A-D may be associated with a certain bottle. This association may be performed automatically, e.g., based on scanning of barcodes or other identifying information on the bottle by the automated liquid dispensing attachment 200 or a device in communication with the automated liquid dispensing attachment.

In some embodiments, the automated liquid dispensing attachment 200 is configured to pour a drink in response to multiple sensor inputs. For example, attachment sensor(s) 212 outputs an attachment signal to the processing circuitry, indicating that the automated liquid dispensing attachment 200 is attached to the bottle. Other sensors, such as a fluid sensor described herein, outputs a fluid presence and/or flow signal to the processing circuitry, indicating that liquid is flowing from the flow tube inlet 206 to the fluid passage. In some embodiments, other sensors and inputs may also be considered. For example, motion sensors (such as accelerometers or gyroscopes) may sense the position of the bottle and/or bottle motion, for example, to prevent pouring under inappropriate conditions, timers may measure the amount of time of a pour, level and other sensors may measure an amount of fluid in the bottle, sensors may provide feedback of flow from the spout, and other sensors may be utilized, as described herein. A direct user input (e.g., such as depressing user input button 214) may be required to pour in some embodiments. Other inputs, such as measurements of temperature, humidity, location (e.g., geofencing or proximity), signals from a point-of-sale or other control system, etc., may also be used to selectively actuate and/or control the liquid flow through the flow passage (e.g., by modifying total amount of a pour, flow rate, etc.).

The exemplary automated liquid dispensing attachment 200 may include wireless communication circuitry 218 for exchanging data with other electronic devices. Suitable wireless interfaces may include Bluetooth, Bluetooth Low Energy, NFC, RFID, mesh networking protocols (e.g., Thread, Bluetooth Mesh, ZigBee), cellular, 5G, unlicensed spectrum protocols, Z-Wave, 6LoWPAN, WiFi-ah (HaLow), 2G (GSM), or other suitable protocols for exchanging information wirelessly. Although the present disclosure may be described in the context of a local communications protocol with a proximately located device such as a gateway, in some embodiments (e.g., as described with respect to FIG. 13) low-power long range communications may be utilized, which may be particularly useful in environments such as convention halls, casinos, arenas, food trucks, ghost kitchens, or other environments where the automated liquid dispensing attachments are frequently moved. In some embodiments, the automated liquid dispensing attachment 200 may include a wired interface, e.g., that detachably connects to a base unit or data reader for selectively exchanging information or providing bulk data downloads. In instances of multiple types of connections (e.g., wired and wireless, multiple types of wireless connections), high-bandwidth connections (e.g., with higher energy usage and possibly intermittent connectivity) may be used for bulk data download, software updates, and non-urgent or periodic communications, while lower-bandwidth connections may be used for alerts, drink information, lock/unlock/change requests, pour requests, and other similar time-sensitive information that relates to the ongoing operation of the establishment.

The automated liquid dispensing attachment 200 may include a variety of sleep and wakeup features to conserve battery life and/or initiate communications, for example, based on the sensed movement of the device (e.g., by an accelerometer and/or gyroscope), approved users entering the area (e.g., an authorized user having a tag or device emitting a beacon signal such as a signal that activates an RFID or NFC component), periodic network polling, or other suitable methodologies for periodically activating the automated liquid dispensing attachment or particular circuitry or functionality thereof. In some embodiments, some subset of the automated liquid dispensing attachments 200 may have enhanced functionality, e.g., to collect data from other local automated liquid dispensing attachments 200 to a gateway, relay control information from a gateway, and receive local inputs (e.g., from an authorized user accessing an enhanced user interface functionality). In this manner, most of the automated liquid dispensing attachments 200 can be relatively "dumb" programmable devices with a series of pre-determined actions based on available control, monitoring, and user interface components and programmed functionality, limiting cost and power usage for the non-enhanced devices.

The automated liquid dispensing attachment 200 is configured to receive a plurality of inputs for controlling and/or permitting the flow of liquid. For example, the automated liquid dispensing attachment 200 is configured to permit pouring of in response to an attachment sensor, a fluid sensing (e.g., capacitive) sensor, a user actuated sensor, a motion sensor, a timer, a temperature sensor, and other suitable sensors or inputs, and other combinations thereof, as described herein. In some embodiments, automated liquid dispensing attachment 200 permits the flow of liquid from the bottle when the attachment sensor 212 is engaged. For example, a fluid presence sensor (e.g., capacitive) sensor senses the presence of liquid, motion sensors such as accelerometers and/or gyroscopes indicate that the automated liquid dispensing attachment 200 is oriented in a pouring position, a user may compress a user interface button 214, local circuitry may receive appropriate messages from a POS system, and the attachment sensor may indicate that the bottle is attached appropriately. In response to one or a suitable combination of these sensors and interfaces providing signals to the processing circuitry, the automatic liquid dispensing attachment 200 activates a components (e.g., opens a fluid passage of a pinch tube) to allow fluid to flow from the flow tube inlet 206 and exit via the spout 220.

Figure 3:
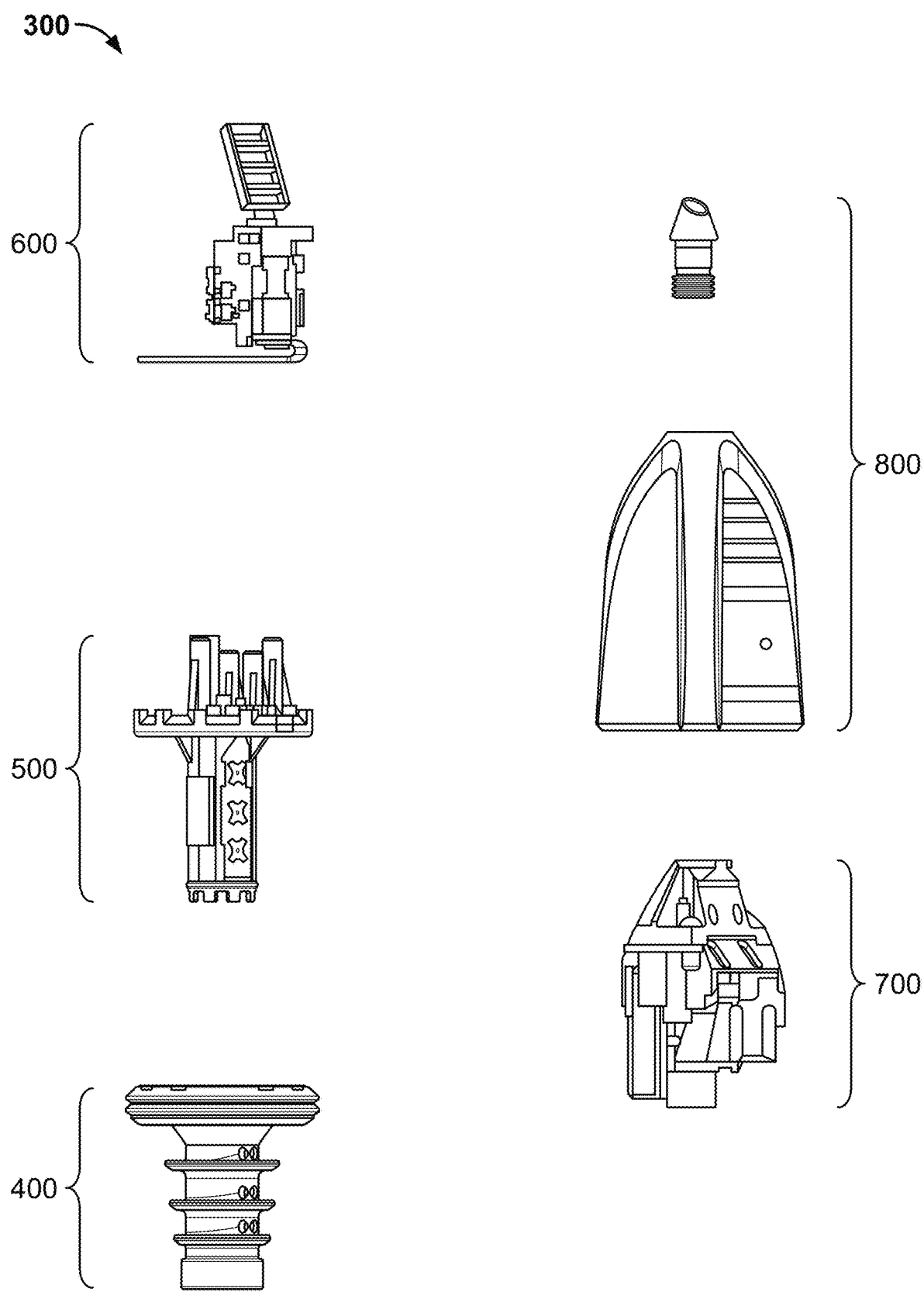
FIG. 3 depicts an exemplary exploded view depicting subsystems of the automated liquid dispensing attachment, in accordance with some embodiments of the present disclosure.

FIG. 3 depicts an exemplary exploded view depicting subsystems of the automated liquid dispensing attachment illustrated in FIG. 2, in accordance with some embodiments of the present disclosure. As shown in FIG. 3, the automated liquid dispensing attachment 300 may include an attachment portion 400, a lower interior housing assembly 500, a flexible printed circuit board 600, an upper interior housing assembly 700 and an upper exterior assembly 800. Although particular components are depicted in FIG. 3 for a particular automated liquid dispensing attachment 300, it will be understood that some of the components may be modified, removed, or replaced, and that the order of certain operations may be modified while retaining automatic liquid dispensing feature described herein. For example, in some embodiments the components and subassemblies depicted in FIG. 3 may be configured in different manners, for example, such that one or more portions associated with the depicted lower interior housing assembly 500 are instead including in the upper interior housing assembly 700, or vice versa.

In some embodiments, the upper exterior assembly 800, including the dome 203 and the spout tip 220, may be disposed over the upper interior housing assembly 700, which in turn integrates with the flexible printed circuit board 600 positioned thereon. The upper exterior assembly 800 may fit over the upper interior housing assembly 700, providing a sealed enclosure for the operational electrical and mechanical components within the housing. In this manner, the only components that are directly exposed to the external environment may be components of the upper exterior assembly 800, the attachment portion 400, and various access holes and passages as described herein (e.g., for a fluid passage and breather tube). The upper interior housing assembly 700 may attach to the lower interior housing assembly 500. In an embodiment, the bottom of the upper interior housing assembly 700 is detachably connected to the top of the lower interior housing assembly 500. The lower interior housing assembly 500 may be positioned within a flexible cavity of the attachment portion 400, with the sensors on the lower interior housing assembly 500 aligning with the attachment ribs on the attachment portion 400 in the embodiment of FIG. 4. Each of the lower interior housing assembly 500 and upper interior housing assembly may include a variety of features for interfacing with and restricting motion of the printed circuit board 600 and other associated components such as a fluid passage, breather tube, battery, motor, pinch tube, actuators, sensors, user interface, and other components as described herein.

Figure 4:
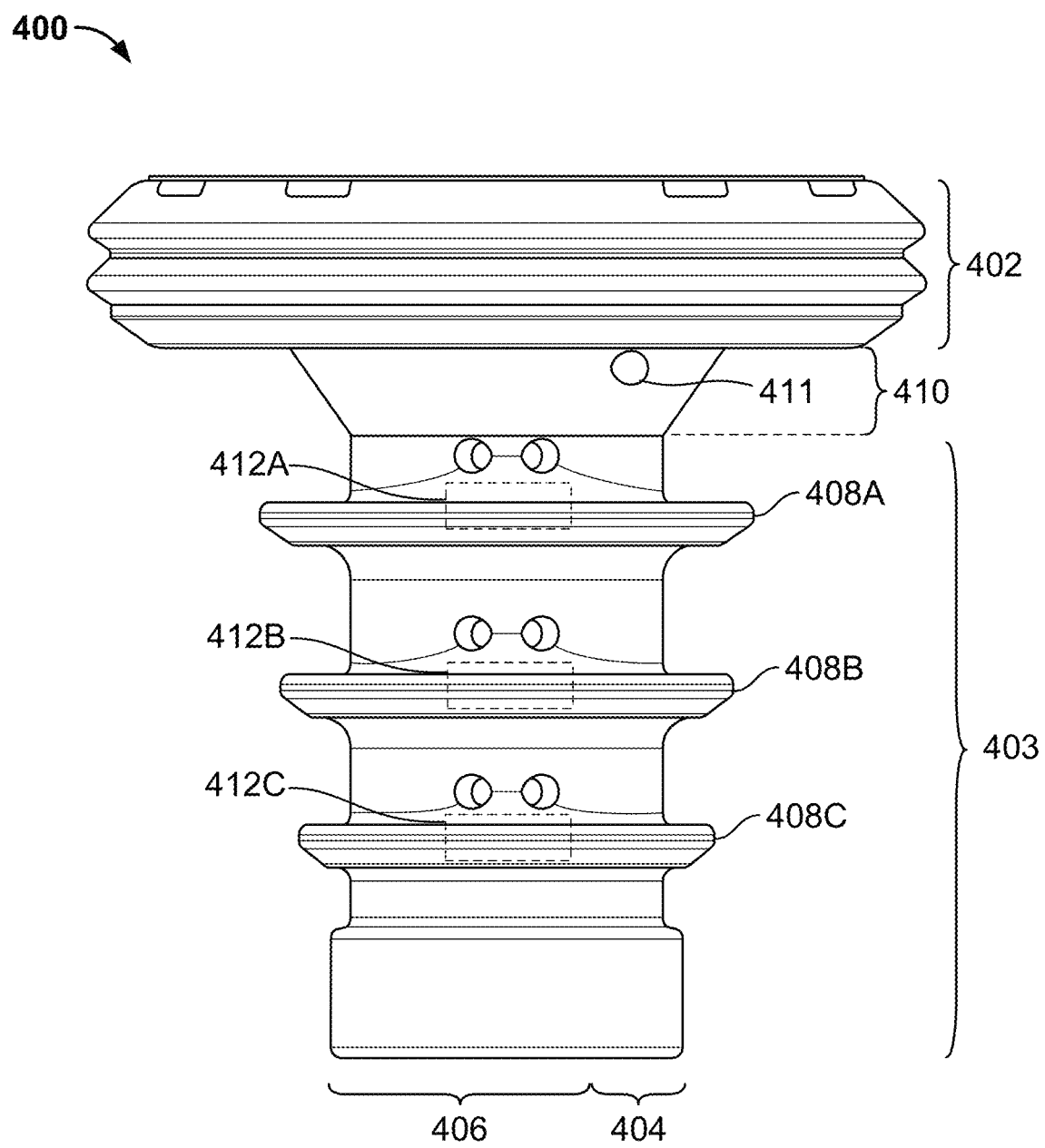
FIG. 4 depicts an exploded view of an attachment portion shown in FIG. 3, in accordance with some embodiments of the present disclosure.

FIG. 4 depicts an enlarged view of an attachment portion 400 shown in FIG. 3, in accordance with some embodiments of the present disclosure. The attachment portion 400 may include a bottle seat 402, a tapered portion 410, an attachment body 403, a flow tube inlet 406, a breather tube inlet 404, attachment ribs 408A-C, and attachment sensor locations 412A-C. Although particular components are depicted in FIG. 4 for a particular attachment portion 400, it will be understood that some of the components may be modified, removed, or replaced, and that the order of certain operations may be modified while retaining the attachment feature described herein. For example, an attachment body 403 may be cylindrical in shape and a tapered portion 410 may have a maximum diameter that corresponds to a diameter of a particular type of bottle opening, but these shapes and sizes may be customized to each particular bottle type and size. The tapered portion 410 may allow plastic internal components (e.g., of FIG. 5) to have support gussets to add strength and rigidity to the components, and also to provide a location for a vent 411 to exchange air between the breather tube and external atmosphere.

The upper surface of the bottle seat 402 acts as a receiving surface for engaging with the upper exterior assembly 800 to create a seal for internal components, while the lower surface provides a surface for seating of the top portion of a bottle. The outer radial surface of the bottle seat 402 may include an area where a seal is created between the cork and upper exterior assembly 800 as the upper exterior assembly 800 is attached over the upper surface of bottle seat 402. In an exemplary embodiment of a double wiper seal of bottle seat 402, the double wiper seal protects the electronics and other internal mechanisms within the main housing from the alcohol and other liquids (e.g., applied during the cleaning process). When a bottle is seated on the lower surface of the bottle seat 402, the tapered portion 410 extending from is bottom surface engages with the opening of the bottle. A breather tube outlet 411 is located near the upper maximum diameter of the tapered portion 410, such that when a bottle attaches and compresses the tapered portion 410, at least a portion of the breather tube outlet 411 is exposed to the external atmosphere of the bottle. In other embodiments, not depicted in FIG. 4, the breather tube outlet may be located at a different location with exposure to the external atmosphere, such as a lower exterior surface of the bottle seat 402.

The attachment body 403 extends from the tapered portion 410 at a location of minimum diameter for the tapered portion 410. This minimum diameter may be sized to provide clearance for an interior cylindrical surface of the bottle to pass over the portions of the tapered portion 410 and attachment body 403 that correspond to the minimum diameter. The attachment body 403 may include the attachment ribs 408A, 408B and 408C extending circumferentially around the attachment body 403 and attachment sensor locations 412A, 412 B and 412C positioned such that compression of each attachment rib 408A-408C applies a force to the corresponding attachment sensor locations 412A-412C. Although three attachment ribs 408A-408C are depicted evenly spaced out along the length of the attachment body, different numbers of attachment ribs may be provided at different locations in other embodiments.

The interior of the bottle seat 402 engages with the lower interior housing assembly while attachment body 403 engages with an interior surface (e.g., cylindrical surface) of a bottle. The breather tube inlet 404 is connected to the breather tube outlet 411 via an internal air passage, such that air is able to pass between the external atmosphere of the bottle and the internal volume of the bottle during pouring, to equalize pressure. In some embodiments, while pouring liquid using the automated liquid dispensing attachment 200, the breather tube inlet 404 provides a location for insertion of a breather tube that selectively allows air to travel between the external atmosphere and the interior volume of the bottle, thereby permitting continual laminar flow of liquid from the flow tube inlet 406 to the spout 220 and avoiding creation of a pressure differential.

Each of the attachment ribs 408A, 408B and 408C may extend around the some or all of the circumference of the outer attachment body 403 of the attachments portion 400, such that when engaged with a bottle fluid is unable to flow past the attachment ribs. The attachment ribs may have a maximum diameter that is greater than the interior diameter of the bottle (e.g., for a bottle having an internal diameter of approximately 75%-90% of the diameter of the largest attachment rib of the attachment ribs) to provide for suitable engagement with the interior surface and compression and deflection of the attachment ribs. In some embodiments, the attachment ribs may be tapered upward in the direction of attachment, to assist with engagement with the interior surface of the bottle during attachment. A taper may also be provided in the other (downward) direction to assist with removal. Although each of the attachment ribs 408A-408C is depicted as having an identical shape, in some embodiments the maximum diameters, taper angles, and shapes may be different between ribs, for example, to provide for selectively increasing force required to engage with particular attachment ribs (e.g., with lesser diameters and/or more taper near the locations of insertion and/or removal from the bottle).

When engaged with an interior surface of the bottle (e.g., a cylindrical surface), the attachment rib may be compressed and deflected upward, applying pressure to the attachment sensor locations 412A-C. Upon the compression and deflection of each attachment rib, a corresponding sensor (e.g., snap domes) may be engaged at the attachment sensor locations 412A, 412 B and 412C, such that an attachment signal based on the engagement of the attachment portion 400 with the interior surface of the bottle is provided. Although an attachment sensor location 412A-412C is depicted as corresponding to each of the attachment ribs 408A-408C, in some embodiments only some of the attachment ribs may correspond to attachment sensor locations (e.g., only the upper-most attachment rib may include an associated attachment sensor location). In other embodiments, not depicted in FIG. 4, an attachment sensor may be located elsewhere where the attachment portion engages with a bottle, such as on the tapered portion 410 and/or on the lower surface of the attachment body 403.

Figure 5:
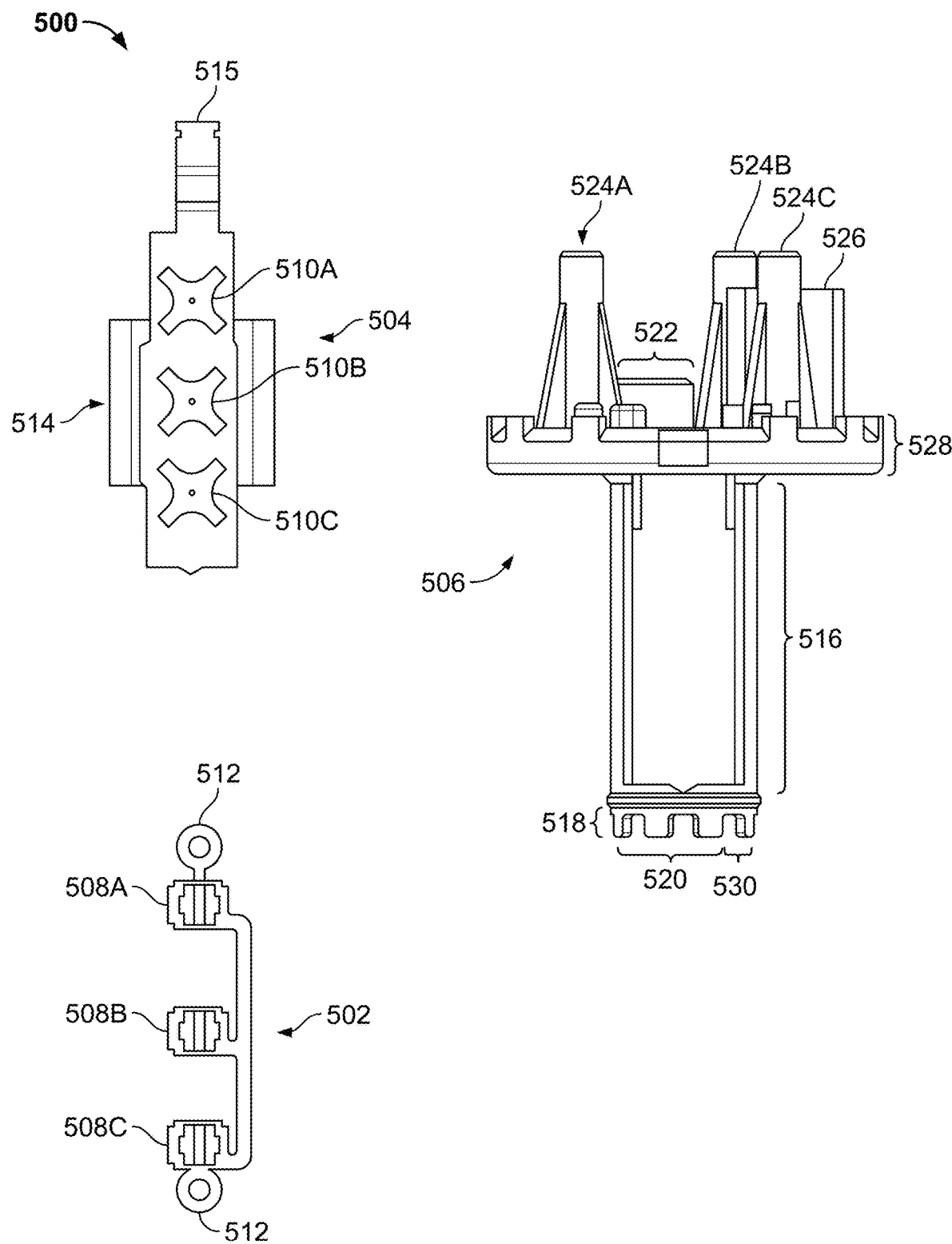
FIG. 5 depicts an exploded view of the assembly of the lower interior housing assembly shown in FIG. 3, in accordance with some embodiments of the present disclosure.

FIG. 5 depicts an exploded view of the assembly of the lower interior housing assembly 500 shown in FIG. 3, in accordance with some embodiments of the present disclosure. The lower interior housing assembly 500 includes a rigid piece 502, a sensor portion 504 and an inlet tube assembly 506. The rigid piece 502 is positioned on top of the sensor portion 504, and collectively, the rigid piece 502 and sensor portion 504 are disposed over the cylindrical member 516 of the inlet tube assembly 506. This assembly is inserted within an interior cavity of attachment portion 403, such that corresponding portions the rigid piece 502 and sensor portion 514 are located under an interior surface of attachment ribs 408A-408C at the attachment sensor locations 412A-412C. Although particular components are depicted in FIG. 5 for a particular lower interior housing assembly 500, it will be understood that some of the components may be modified, removed, or replaced, and that the order of certain operations may be modified while retaining the attachment feature described herein.

The exemplary rigid piece 502 may include rigid members 508A, 508B and 508C and attachment rings 512 at each end. The rigid piece 502 may be positioned between the attachment ribs of the attachment portion 400 and sensor portion 504, which may be positioned on the inlet tube assembly 506. Rigid piece 502 may be a suitable insert (e.g., polycarbonate insert) that is over molded into the attachment portion. In some embodiments, a first rigid member 508A may be positioned at one end of the rigid piece 502 and correspond to and be located over the first attachment sensor 510A, a second rigid member 508B may be positioned at the middle of the rigid piece 502 and located over the second attachment sensor 510B and a third rigid member 508C may be positioned at the other end of the rigid piece 502 and located over the third attachment sensor 510C. Each of the rigid members, 508A, 508B and 508C, may be associated with a corresponding attachment rib 408A, 408B and/or 408C of the attachment portion 400 and a corresponding attachment sensor 510A, 510B and 510C. The attachment sensors 510A, 510B and 510C (e.g., each a respective snap dome), may be responsive to a force applied to the external surface of the attachment portion 400, for example, the force applied to the attachment ribs 408A, 408B and 408C, after being inserted onto the opening of a bottle and transmit an attachment signal to the processing circuitry. Upon a force applied to the attachment sensor 408A, 408B and 408C causing a movement applied to the attachment sensors 510A-510C via the rigid member 508A-508C, each of the attachment sensors transmits the attachment signal (e.g., as a digital signal based on the force exceeding the threshold and/or an analog signal proportional to the applied force) to the processing circuitry. In some embodiments, the attachment signal may include a plurality of attachment sub-signals corresponding to attachment sub-sensors located on the rigid piece or any subset thereof.

The exemplary sensor portion 504 may include attachment sensors 510A-C, a fluid sensor 514, and connection member 515. The attachment sensors 510A-C are positioned on the face of the sensor portion 504 and aligned in the longitudinal direction, although in some embodiments (not depicted in FIG. 5) the attachment sensors may be distributed about the diameter of the sensor portion, for example, to ensure equivalent distributions of stresses or to sense uniform attachment about the diameter of the automated liquid dispensing device. Further, the attachment sensors 510A-C are configured to be responsive to a force applied to the external surface of the attachment sensors 510A-C, and in response to receiving a force, transmitting an attachment signal to the processing circuitry. The fluid sensor 514 is physically and electrically connected to the sensor portion 504 and at least partially surrounds the fluid passage that liquid flows through, for example, around the exterior surface of the cylindrical body 516 of the inlet tube assembly 506. In some embodiments, the fluid sensor 514 may be a capacitance sensor, with electrical traces (not depicted in FIG. 5) that wrap around the circumference of the fluid passage 516 and that collectively register a change in capacitance when in proximity to liquid passing through the fluid passage 516.

In some embodiments, the outputs of the sensor portion 504 are provided to processing circuitry via connection member 515 (e.g., via a through hole in assembly base 528) and used as inputs for controlling a fluid control device to open, close and regulate the volume of fluid flowing from the bottle to the spout 220 via the fluid passages of the liquid dispensing attachment. For example, absent signals indicating that all of the attachment sensors 510A-C have been activated, the fluid control device may be set to a closed position to prevent fluid flow to the opening of the spout 220, and instructions and alerts may be provided to a user, such as through a user interface (e.g., particular patterns/colors of LED outputs) and communication interface (e.g., messages wirelessly sent to other devices). In some embodiments, each of the attachment sensors 510A-510C may be configured to provide a signal to a processor that operates a fluid control device to allow fluid to flow to the opening of the spout 220 based on attachment sub-signals indicating that a force is applied to each of the attachment sensors 510A-510C. For example, each attachment rib may receive a force via the attachment portion 400 being inserted into a top of the bottle, such that the rigid piece within each of the attachment rib may push the rigid member 508A-C into attachment sensors 510A-C, which may transmit the attachment sub-signal to the processing circuitry. By compressing the attachments ribs and actuating the attachments sensors 510A-C, the attachment sensors 510A-C output an attachment signal based on the engagement of the attachment portion 400 with the interior surface of the bottle.

In some embodiments, the fluid sensor 514 may be configured to measure fluid presence and/or flow, which in turn may be used as a control input to a processor to control the fluid control device. For example, in response to receiving a signal from the fluid sensor 514 indicating the presence of fluid, and other inputs such as from the attachment sensor, motion sensors, and user inputs, the fluid control device is set to open position and may allow fluid to flow to the opening of the spout 220. Based on the fluid sensor indicating the presence of fluid, and correlating that with an amount of time for that fluid flow (e.g. based on the amount of time when the fluid passage is open) and other sensor outputs (e.g., temperature, viscosity, ultra-sonic, etc.), a volume of fluid dispensed by the liquid dispensing attachment may be measured. In some embodiments, flow rate may be determined directly by the fluid sensor 514 based on patterns of the capacitive sensor. The absolute amplitude, frequency, peak-to-trough amplitude, and other aspects of the signal may be correlated with fluid flow, as compared to a stationary presence of fluid. In some embodiments, the fluid sensor 514 may be tuned (e.g., by modifying component values and/or swapping out capacitive sensor trace patterns) for suitability of sensing of particular fluids.

The exemplary inlet tube assembly 506 may be the innermost assembly that is associated with the flow tube inlet and through which fluid flows from the bottle into the automated liquid dispensing attachment, and eventually to the spout 220. The inlet tube assembly 506 may include a cylindrical portion 516, a saw tooth member 518, a fluid passage opening 520, a fluid outlet 522, attachment pieces 524A-C, battery holder 526, an assembly base 528, and a breather tube passage 530. The fluid passage opening 520 is configured with a saw tooth member 518 and the cylindrical portion 516 extends from the fluid passage opening. The cylindrical portion 516 extends to the assembly base 528 with a fluid exit passage 522 protruding from the assembly base 528 and providing a passage for fluid passage opening 520 at the other end. The assembly base 528 further attaches to the battery holder 526 and attachment pieces 524A-C. The fluid passage opening 520 may be configured with a saw-tooth member 518 configured to engage with an interior surface of the attachment portion 400 (not depicted), such that the attachment portion 4000 generally attaches over the lower interior housing assembly 500. The saw-tooth member 518 may include cutouts around the circumference of the saw-tooth member 518. The cutouts may be evenly positioned and alternate with non-cutout portions on the saw-tooth member 518 around the entire circumference of the fluid passage opening, or may be in other suitable configurations for fixedly attaching the lower interior housing assembly 500 to the attachment portion 400. The fluid outlet 522 is the passage by which the fluid provided via fluid passage opening 520 travels to the other fluid passage components of the automatic liquid dispensing attachment. The fluid outlet 522 is connected to additional components of the fluid passage such as a pinch tube at one end, and via the internal passage of the inlet tube assembly 506, the fluid passage opening 520.

The inlet tube assembly 506 may include a first housing attachment piece 524A, a second attachment piece 524B and a third attachment piece 524C, for receiving lower attachment pieces 718A, 718B, 718C for attaching the lower skeleton 702 to the inlet tube assembly 506. In an exemplary embodiment, the attachment may be performed via screws, although other attachment methods such as mating tabs or threads, adhesives, etc., may be used in other embodiments.

Figure 6:
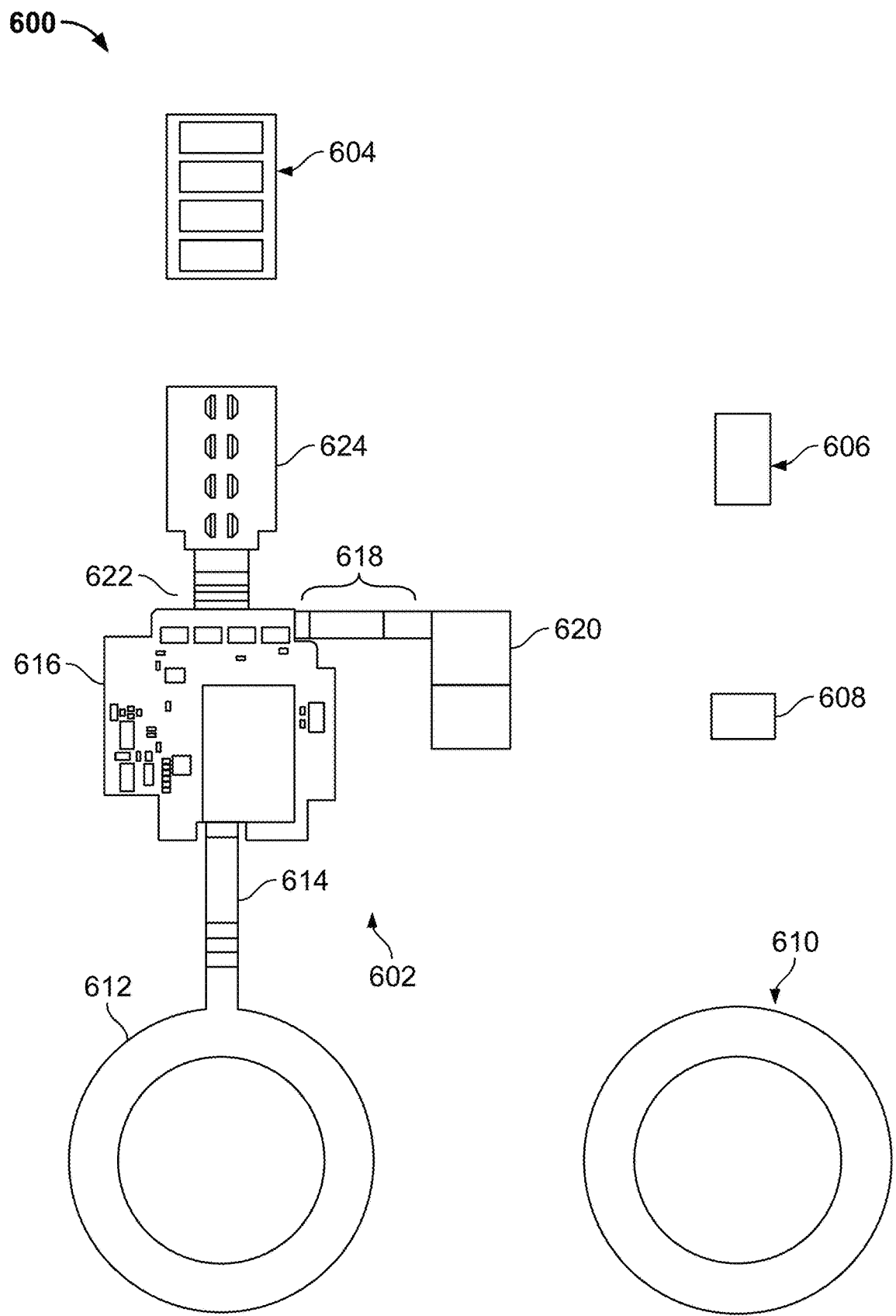
FIG. 6 depicts an exploded view of the flex printed circuit board (PCB) assembly shown in FIG. 3, in accordance with some embodiments of the present disclosure.

FIG. 6 depicts an exploded view of the flex printed circuit board (PCB) assembly shown in FIG. 3, in accordance with some embodiments of the present disclosure. The flex printed circuit board (PCB) assembly includes flex printed circuit board 602, LED insert 604, rear LED insert 606, touch insert 608 and ferrite ring 610. Each of the LED insert 604, rear LED insert 606, and touch insert 608 may be formed from a non-conductive compliant material such as a national sanitation foundation (NSF) certified polymer. Although particular components are depicted in FIG. 6 for a particular flex printed circuit board (PCB) assembly, it will be understood that some of the components may be modified, removed, or replaced, and that the order of certain operations may be modified while retaining circuitry feature described herein.

In an embodiment, the exemplary flex printed circuit board 602 includes a printed board for processing circuitry, communication circuitry, and sensors (e.g., temperature sensors, motion sensors, etc.) and that connects to other electrical components of the automatic liquid dispensing attachment 200. Most portions of the printed circuit board 602 are seated on an exterior upper surface of the upper interior housing assembly 700 and ferrite ring connector 612 is seated over a corresponding internal surface of assembly base 528. The flex printed circuit board 602 includes a ferrite ring connector 612, seated and attached on an upper surface of the ferrite ring 610, and a printed circuit board member 616 seated on and attached to a side of the upper interior housing assembly 700. The ferrite ring connector 612 is physically and electrically connected to the printed circuit board member 616 via the flexible connecting member 614. The printed circuit board member 616 is connected to the user interface input unit 620 via the flexible connecting member 618. The printed circuit board member 616 is further connected to the LED assembly support 624 via the flexible connecting member 622. The flex printed circuit board also 602 includes connection points for attachment to a battery (not depicted).

The LED assembly 624 may include LED lights positioned on the LED assembly 624 to align with the light guides discussed above with reference to FIG. 2, although other user interfaces (e.g., miniature display screens, text displays, haptic interfaces, other light sources, audio outputs, etc.) may be provided in other embodiments with or as a substitute for LED assembly 624. The LED assembly 624 may include a plurality of LEDs. The LED insert 604 is seated on the LED assembly and configured to permit light from the LEDs to pass through the opening in the LED insert 604 and to fixedly locate the LEDs relative to light guides at the external viewable surfaces of the automated liquid dispensing attachment. In an exemplary embodiment, the LED assembly 624 may include 4 sets of LEDs. Each LED of a set of LEDs may be individually controlled using the processing circuitry and combinations of LEDs may be illuminated in desired arrangements. In some embodiments, the color and/or intensity of the LEDs may be controlled. For example, a particular color may be associated with a specific server, e.g., waiter, and in response to the customer ordering a drink, the automated liquid dispensing attachment 200 engaged with that drink may illuminate the specific color associated with the server. In another example, by entering a mixed drink, e.g., long island iced tea, the user interface may illuminate the automated liquid dispensing attachments 200 associated with each one of the alcoholic beverages to make a long island iced tea.

The ferrite ring connector 612 of the flex printed circuit board 602 is seated over and attached to the ferrite ring 610 which in turn is seated over the upper surface of the assembly base 528, such that the ferrite ring 610 can interface with electromagnetic fields provided for inductive charging of a battery (not depicted in FIG. 6) that is electrically connected to the ferrite ring. Each of the rear LED insert 606 and touch insert 608 may be seated over portions of the upper interior housing 700 and provide support for respective components and PCB interfaces.

In an embodiment, user interface input unit 620 is seated over touch insert 608, which in turn, is seated over a portion of the upper interior housing assembly 700, and may be located under a corresponding touch input on the exterior dome 800. In this manner, a user may provide a control input to the processing circuitry by applying a force (e.g., by depressing a finger) to the user interface input unit. In some embodiments, the user interface output is a binary "1" or "0," while in other embodiments, the output may be a value that scales with pressure, while in yet other embodiments multiple input buttons may be provided. Other user interface control inputs may be provided in other embodiments, such as sound inputs (e.g., voice control), touchscreen inputs, etc. Inputs are also provided to the automated liquid dispensing system via communication circuitry of the processing circuitry.

Figure 7:
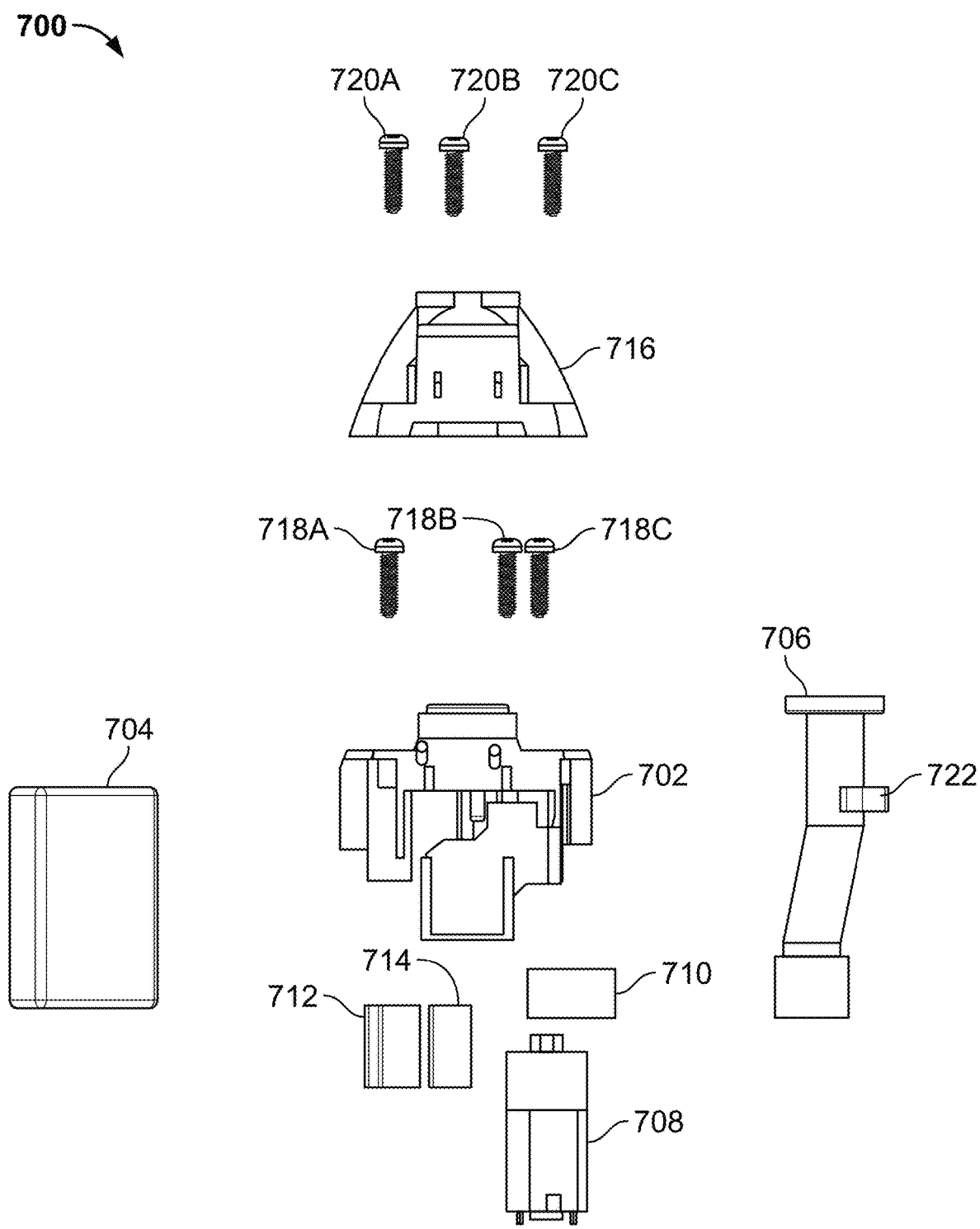
FIG. 7 depicts an exploded view of the upper interior housing assembly shown in FIG. 3, in accordance with some embodiments of the present disclosure.

FIG. 7 depicts an exploded view of the upper interior housing assembly 700 shown in FIG. 3, in accordance with some embodiments of the present disclosure. The upper interior housing assembly 700 may include a lower skeleton 702, a battery 704, a pinch tube 706, a motor 708, a pinching extension 710, battery inserts 712 and 714, lower screws 718A-718C for attaching the lower skeleton 702 to the inlet tube assembly 506, and upper screws 720A-720C for attaching the upper skeleton 716 to the lower skeleton 702. Although particular components are depicted in FIG. 7 for a particular upper interior housing assembly 700, it will be understood that some of the components may be modified, removed, or replaced, and that the order of certain operations may be modified while retaining the interior housing assembly 700 feature described herein.

Although attachment between the lower skeleton 702 and the inlet tube assembly 502 may be performed in a variety of manners, in an embodiment the lower screws 718A, 718B, 718C may attach the lower skeleton 702 which is seated on the inlet tube assembly 506 via the first attachment piece 524A, the second attachment piece 524B and third attachment piece 524C. The upper interior housing assembly 716 may be seated on the lower assembly 702 and may be connected, for example, by upper screws 720A-720C.

The battery 704 may be seated on the assembly base 528 and adjacent to the lower assembly 702. The battery may provide power to the automated liquid dispensing attachment 200, which in an embodiment may be charged by inductive charging (e.g., by placing the automated liquid dispensing attachment 200 in a charging port 902 in a charging station 900 such that the battery interfaces with charging coils of an inductive charger).

The pinch tube 706 is positioned in the central cavity of the lower assembly 702 and is attached to the fluid passage opening 520, for example, by a press fit and/or with an adhesive or locking feature. An upper portion of the pinch tube 706 may be connected to a spout 808, for example, by a press fit and/or with an adhesive or locking feature. The pinch tube 706 may be made of suitable compliant material such as a national sanitation foundation (NSF) certified polymer, and may include a pinching feature 722 for engagement with a fluid control device. A pinching extension 710 such as an offset paddle is configured to control the flow of fluid through the pinch tube 706 by selectively engaging with the pinching feature 722 to partially or completely cut off the flow of fluid through pinch tube 706. For example, the motor 708 (e.g., an electric motor such as a DC brushed motor with a planetary gearhead) may be electrically connected to (e.g., via one or more connectors) and receive instructions from the processing circuitry of the flex PCB to cause rotation which in turn moves the offset pinching extension 710 to a particular position. The motor 708 may be self-locking, such that it will not move from a current rotational position absent an applied pressure that is substantially greater than the pressure that may be applied by a fluid in the pinch tube. In this manner, the pinching extension 710 may remain in a position that holds the pinch tube in a desired manner (e.g., in closed position to prevent any fluid to travel through the fluid passage, an open position such that the paddle permits a full flow of fluid through the fluid passage, or a partially closed position in which the flow of fluid is limited).

This fluid control device (e.g., motor 708 and pinching extension 710), when set to cause the pinch tube 706 to be in the closed position, may pinch the pinch tube 706 to prevent liquid to flow to the opening of the spout. To ensure that the dosing of liquid is uniform and accurate, the automated liquid dispensing attachment 200 may employ the capacitance sensors 514 and other components (e.g., a timer) to measure fluid presence and/or flow, and compare the flow with an expected flow based on the status of the pinch tube of open, closed, or partially closed. The pinching extension 710 is external to the pinch tube 706 and, when in the closed position, pinches the pinch tube 706. In the closed position, the pinching extension 710 compresses the pinch tube 706 to prevent liquid flow. The pinching extension 710, when moved to an open position, is rotated to a cavity adjacent to the pinch tube 706 to permit fluids to flow. The motor 708 may be connected with pinching extension 710 to the lower skeleton 702.

Figure 8:
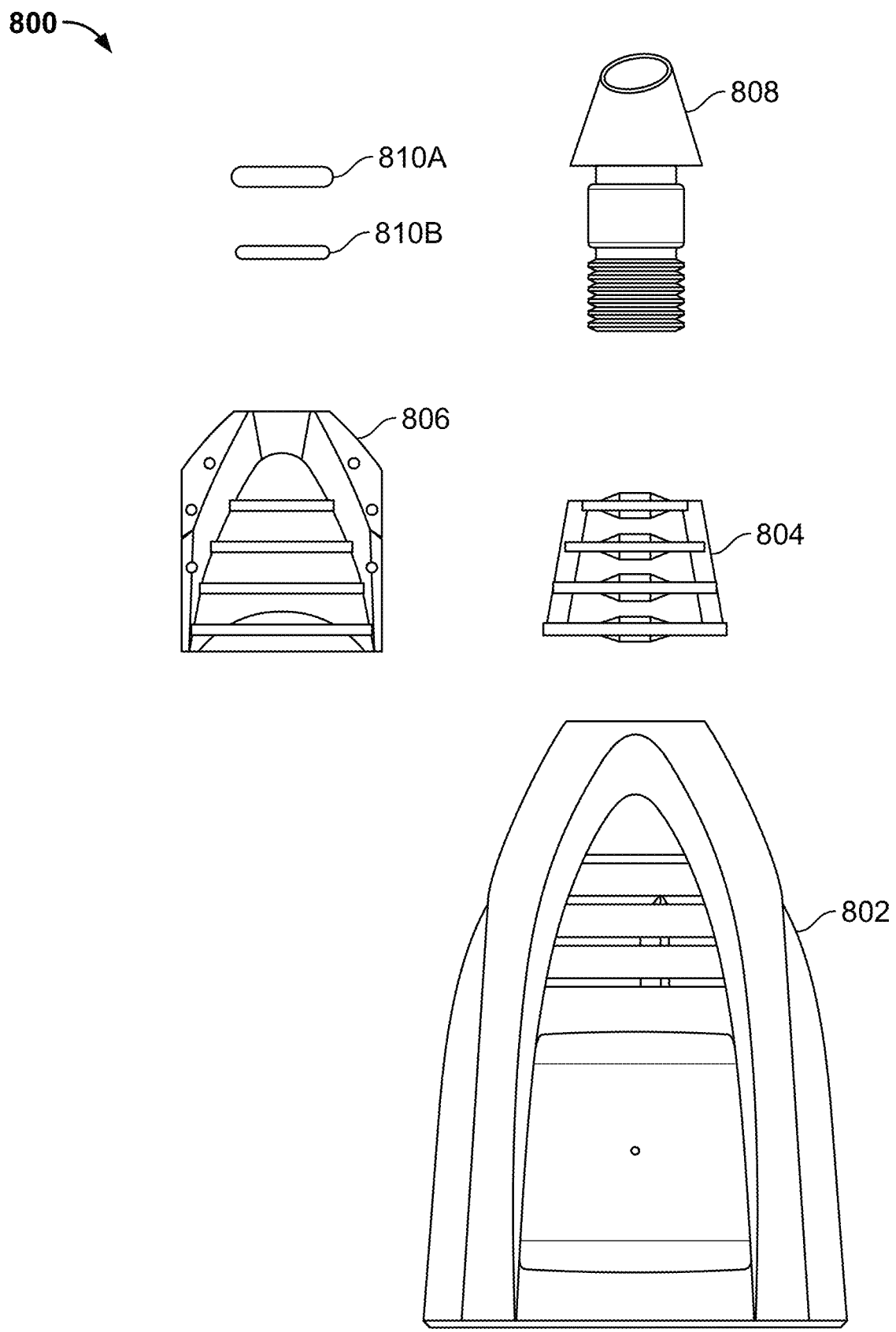
FIG. 8 depicts an exploded view of the upper exterior housing assembly shown in FIG. 3, in accordance with some embodiments of the present disclosure.

FIG. 8 depicts an exploded view of the upper exterior housing assembly 800 shown in FIG. 3, in accordance with some embodiments of the present disclosure. The upper exterior assembly 800 may include exterior housing 802, light pipes 804, light guide 806, spout tip 808 and gaskets 810A, 810B. Although particular components are depicted in FIG. 8 for a particular upper exterior assembly 800, it will be understood that some of the components may be modified, removed, or replaced, and that the order of certain operations may be modified while retaining upper exterior assembly 800 feature described herein. The exterior housing 802 is seated on the upper interior housing assembly 700 and includes interior surfaces configured to engage with portions of the upper interior housing assembly 700. In some embodiment, the light pipes 804 are seated on the light guides 806, which collectively are seated on the side of the exterior housing 802. Further, the spout tip 808 includes grooves for the gaskets 810A and 810B to sit. The gaskets 810A and 810B provide a seal as the spout tip 808 is connected to the pinch tube 706 via interior threads of lower skeleton 702, thereby forming the complete fluid passage (e.g., including flow tube inlet 406, fluid passage opening 520, fluid outlet 522, pinch tube 706, and spout 808). The spout tip inserts through the upper tip of the exterior housing 802 such that its threads engage with interior threads of the lower skeleton, thereby fixedly attaching the upper exterior assembly to the other components of the automated liquid dispensing device, and creating a seal over the lower interior housing assembly and upper housing assembly.

The light pipes 804 provide a path for light from the LED lights on the LED assembly 624 to the viewable exterior surface of the upper exterior assembly. The light guide 806 is positioned on the light pipes 804 and locates the light pipes in the proper position and configuration. The light pipes 804 and light guide 806 are configured to direct the light in a uniform direction without hot spots to provide a uniform light output. Each of the exterior housing 802, light pipes 804, sight guide 806, and gaskets 810A/810B may be is made of a material such as a national sanitation foundation (NSF) certified polymer.

Figure 9:
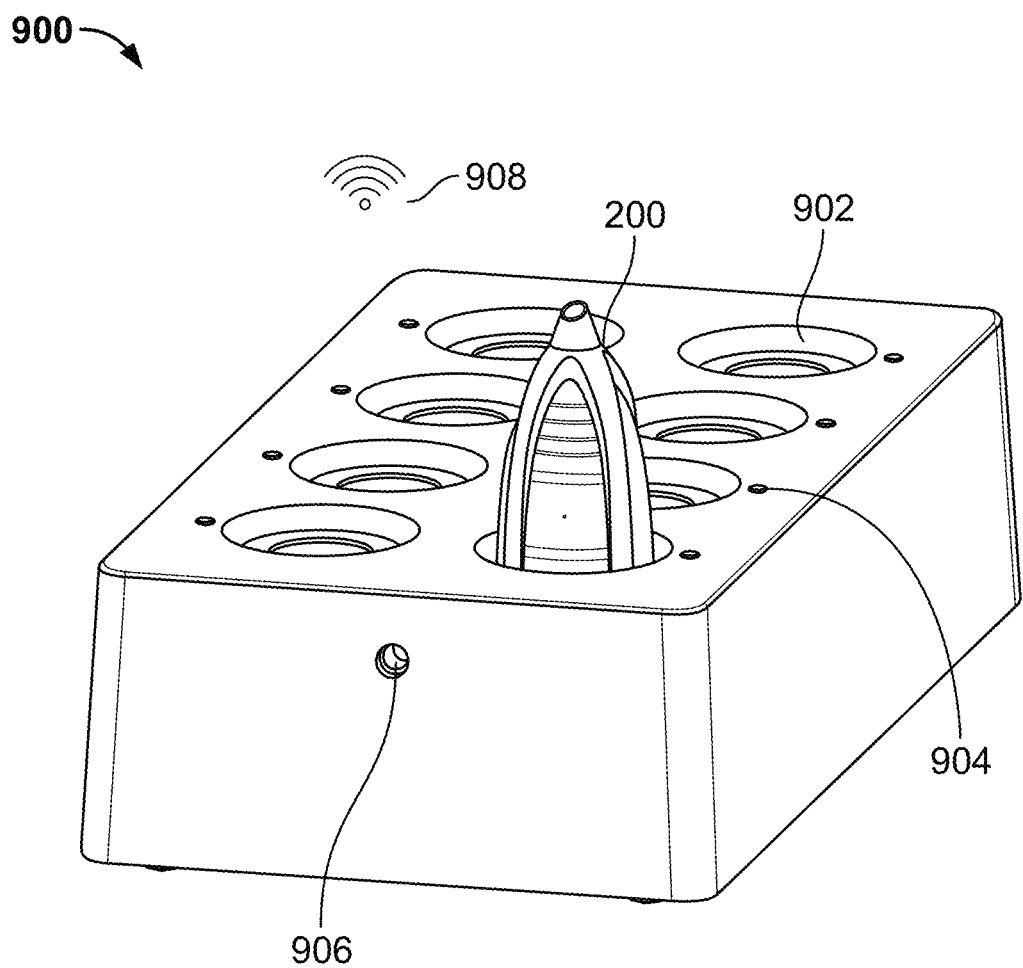
FIG. 9 depicts an exemplary view of a charging port for a plurality of automated liquid dispensing attachments, in accordance with some embodiments of the present disclosure.

FIG. 9 depicts an exemplary view of a charging port for a plurality of automated liquid dispensing attachments, in accordance with some embodiments of the present disclosure. The charging port 900 may include a plurality charging stations 902 for automated liquid dispensing attachments 200, with upper surfaces of each charging station providing for an electromagnetic interface with a ferrite ring 610 of a respective liquid dispensing attachment. Each charging station 902 of the plurality charging stations 902 may include a charging indicator 904. The charging indicator 904 may illuminate based on the status of the charging station. For example, when the automatic liquid dispensing attachment is fully-charged, a green light may illuminate, while when the charging is still in the process of charging, a yellow light or red light may illuminate. The charging port 900 may further include a connection port 906 on the side of the charging port for receiving an electrical power supply and wireless communication circuitry 908 for transmitting a status signal to automatic liquid dispensing control system. Although particular components are depicted in FIG. 9 for a particular charging port 900, it will be understood that some of the components may be modified, removed, or replaced, and that the order of certain operations may be modified while retaining charging port 900 feature described herein.

Suitable wireless communication circuitry 908 of charging port 900 may include Bluetooth, Bluetooth Low Energy, NFC, RFID, mesh networking protocols (e.g., ZigBee), cellular, 5G, unlicensed spectrum protocols, or any other suitable protocols for exchanging information wirelessly. In some embodiments, the charging port 900 may include a wired interface, e.g., that detachably connects to an automated liquid dispensing attachment 200 or data reader for selectively exchanging information or providing bulk data downloads. In instances of multiple types of connections (e.g., wired and wireless, multiple types of wireless connections), high-bandwidth connections (e.g., with higher energy usage and possibly intermittent connectivity) may be used for bulk data download, software updates, and non-urgent or periodic communications, while lower-bandwidth connections may be used for alerts, drink information, lock/unlock/change requests, pour requests, and other similar time-sensitive information that relates to the ongoing operation of the establishment.

Figure 10:
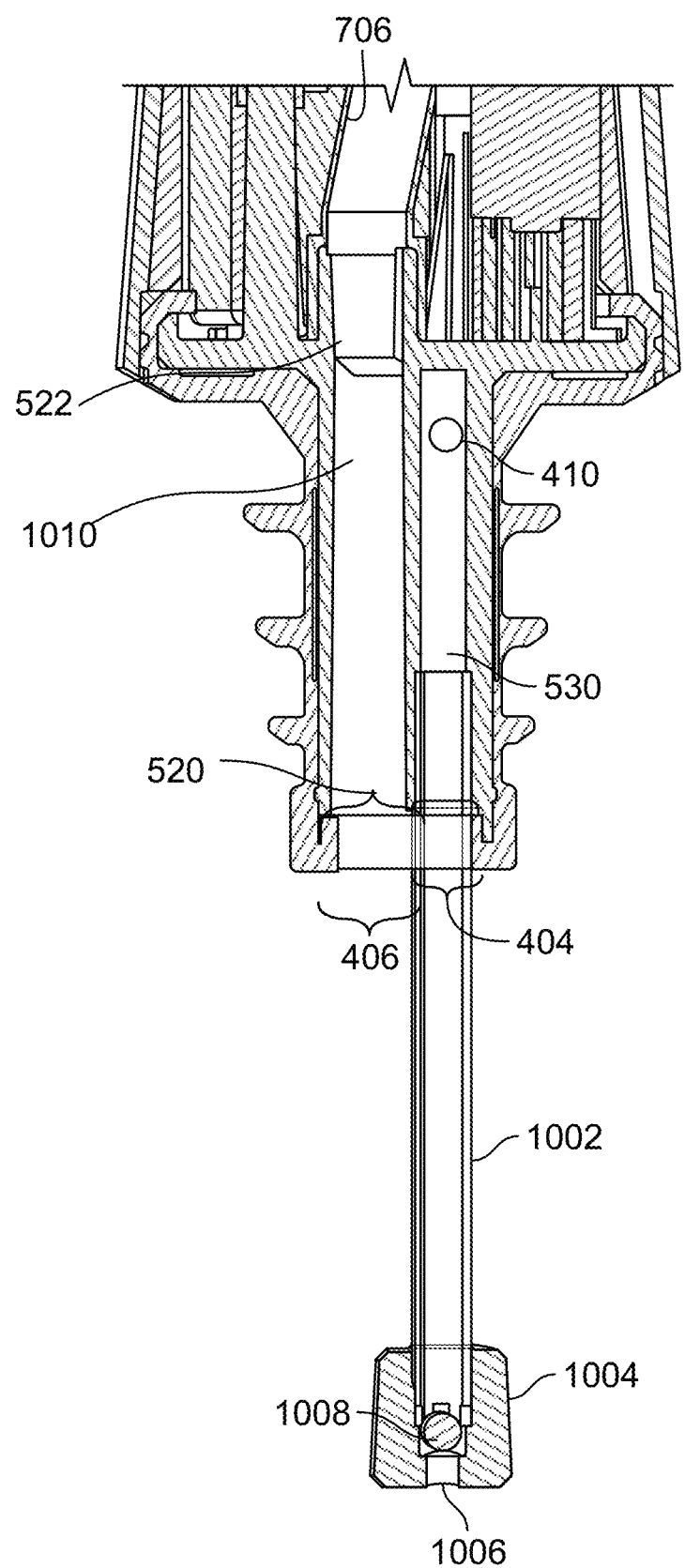
FIG. 10 depicts a cross-sectional view of the automated liquid dispensing attachment illustrating attachment of a breather tube, in accordance with some embodiments of the present disclosure.

FIG. 10 depicts a cross-sectional view of the automated liquid dispensing attachment illustrating attachment of a breather tube, in accordance with some embodiments of the present disclosure. In the cross-section view of the automated liquid dispensing attachment 200 includes a pinch tube 706 connected to fluid outlet 522, a fluid passage 1010 between fluid outlet 522 and fluid passage opening 520, and from fluid passage opening 520 an opening at flow tube inlet 406. A breather tube 1002 is attached and positioned at the breather tube inlet 404 and to breather tube passage 530. Although particular components are depicted in FIG. 10 for a particular breather tube, it will be understood that some of the components may be modified, removed, or replaced, and that the order of certain operations may be modified while retaining the breather tube feature described herein.

The breather tube 1002 is positioned in the breather tube passage 530, e.g., by a press fit through the breather tube opening 404. The breather tube 1002 may permit air to flow into the bottle and provides airflow that equalizes pressure in the bottle, thereby permitting a consistent laminar flow of fluid through the flow tube 706. In the closed configuration (e.g., when the bottle is sitting in a flat position), the ball 1008 is positioned in the breather tube housing 1004, blocking the opening 1006, with the ball 1008 seated on the opening 1006. When the bottle is turned, the ball 1008 moves from over the opening 1006, allowing air to flow through the breather tube via breather tube outlet 411 and breather tube passage 530.

Figure 11:
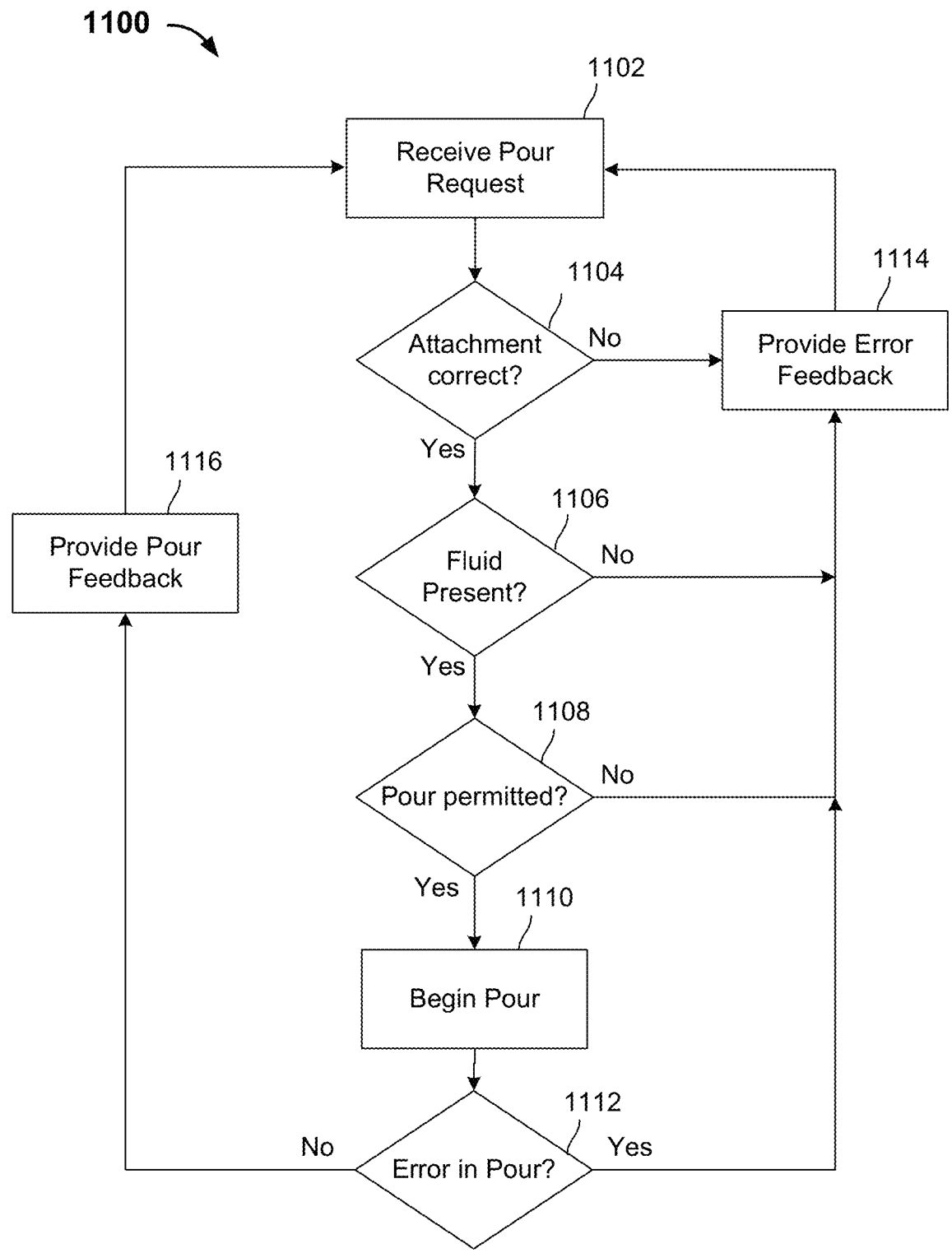
FIG. 11 depicts an exemplary flowchart of a process of employing the automated liquid dispensing attachment and other supporting hardware and software, in accordance with some embodiments of the present disclosure.

FIG. 11 depicts an exemplary flowchart of the process of employing the automated liquid dispensing attachment and other supporting hardware and software of an automated liquid dispensing attachment, in accordance with some embodiments of the present disclosure. Although FIG. 11 is described in the context of the particular structures, components, and processing of the present disclosure, it will be understood that the methods and steps described in FIG. 11 may be applied to a variety of liquid dispenser designs, methods, and processing circuitry. Although a particular order and flow of steps are depicted in FIG. 11, it will be understood that in some embodiments, one or more of the steps may be modified, moved, removed, or added, and that the order of steps depicted in FIG. 11 may be modified.

Exemplary steps for automated liquid dispensing may begin at step 1102, where a customer may place an order, such as through an application on a user device, a kiosk, a voice-recognition interface of the user device or establishment, or by conventional means of providing an order to a bartender or other employee. However the order is placed, this may be processed by the system, such that a command is provided wirelessly and/or by user interaction to an automated liquid dispensing attachment 200. Information relating to the order (e.g., bottles and other items to be used for the preparation of the order, other items such as mixers and garnishes to be added to the order, items to access from inventory, automated systems to activate, etc.) may be distributed to the system to assist in completing the beverage order.

At step 1104, the system, via the processing circuitry, determines whether the attachment is engaged with a bottle. For example, the system verifies that the automated liquid dispensing attachment is connected to the bottle based on the attachment sensors. In response to determining that the attachment is engaged, ("Yes" at 1104), the rule verification proceeds to step 1106. In response to determining that an attachment is not engaged ("No" at 1104), the process proceeds to step 1114, where error feedback loop is provided to the system.

At step 1106, the system, via the processing circuitry, determines whether fluid is present in the attachment. For example, the system verifies that fluid is present at the fluid sensor as described herein. In response to determining that fluid is present ("Yes" at 1106), the process proceeds to step 1108. In response to determining that fluid is not present ("No" at 1106), the process proceeds to step 1114, where error feedback is provided to the system.

At step 1108, the system, via the processing circuitry performs additional checks to if a pour is permitted. For example, various inputs may be considered, such as whether a proper user input (e.g., pressing the pour button) has been provided, an approved employee is in proximity to the automated liquid dispensing attachment, the bottle is an appropriate position and state (e.g., based on measurements from motion sensors), the temperature is appropriate, and the like. In response to determining that a pour is permitted, ("Yes" at 1108), the rule verification proceeds to step 1110. In response to determining that a pour is not permitted for any of these reasons, ("No" at 1108), the rule verification proceeds to step 1114, where error feedback is provided to the system. If the pour is permitted, processing continues to step 1110.

At step 1110, the system begins and performs the pour, for example, by causing the motor 708 to disengage pinching extension 710 from pinch tube 706, opening a passage for liquid to flow from the spout. The pour may be monitored until it is determined to be complete, for example, based on the fluid sensor determining that an amount of fluid has flowed through the fluid passage, passage of a period of time during which a particular fluid flow setting was applied, direct measurement of fluid flow, and/or measurement of a volume of liquid in the bottle (e.g., based on a sensor of the automated liquid dispensing attachment such as an ultrasonic sensor, level displacement sensor, and/or other adjacent sensor in communication with automated liquid dispensing attachment). Once the desired fluid flow is complete, the motor 708 may be controlled to reengage pinching extension 710 to the pinch tube 706 to shut off fluid flow. In some embodiments, not depicted in FIG. 11, the parameters monitored in the prior steps may continue to be monitored during the pour, stopping the pour if an error condition is detected and/or logging parameters for reporting. Once the pour is complete, processing may continue to step 1112.

At step 1112, the system, via the processing circuitry performs a check to determine whether an error occurred during the pour of the drink. In response to determining that an error occurred during the pour of the drink ("Yes" at 1112), the process proceeds to step 1114, where error feedback loop is provided to the system. For example, if an incorrect volume was poured or motion sensors indicate that a bottle was moved in a manner that likely corresponds to a spill, an error may be identified. In response to determining that an error did not occur during the pour of the drink ("No" at 1112), the process proceeds to step 1116, where the results of the pour are reported to the system.

Figure 12:
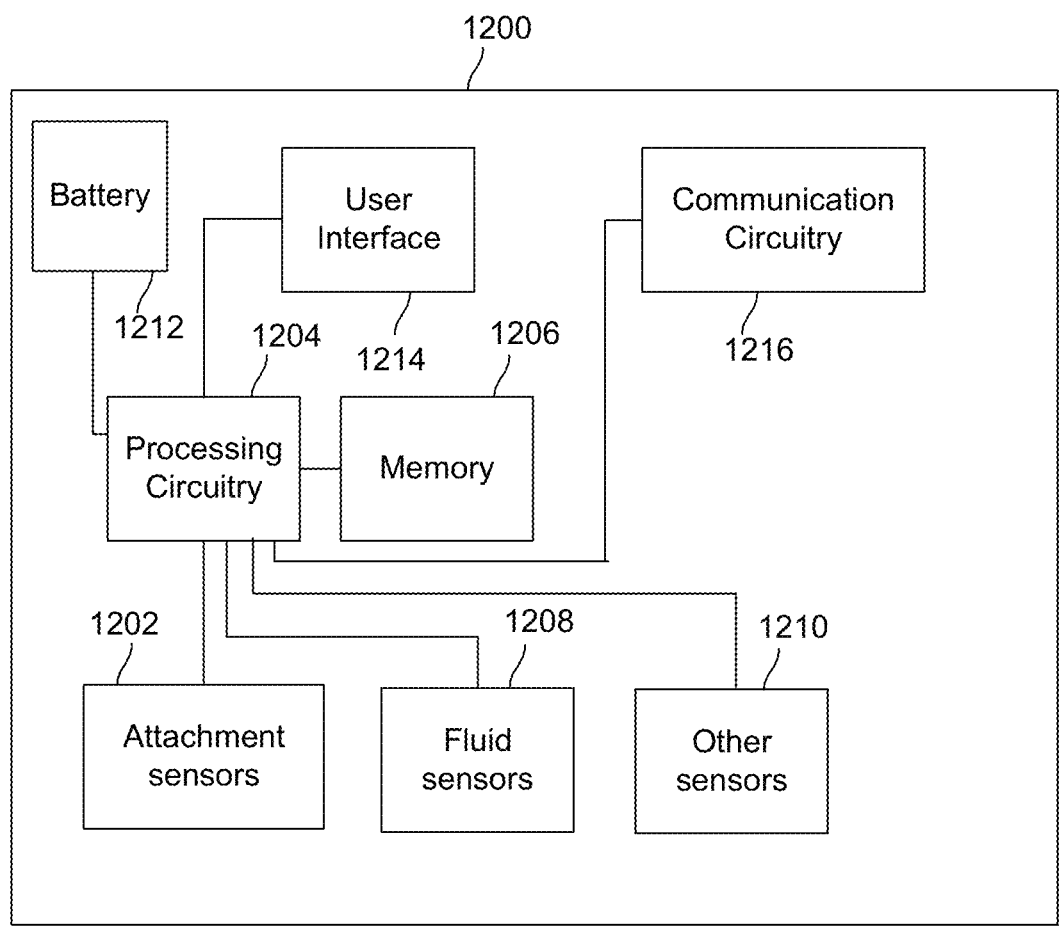
FIG. 12 depicts a block diagram of an exemplary automated liquid dispensing attachment, in accordance with at least some embodiments of the present disclosure.

FIG. 12 depicts a block diagram of an exemplary automated liquid dispensing attachment 1200 in accordance with some embodiments of the present disclosure. Although particular components are depicted in FIG. 12, it will be understood that other suitable combinations of hardware and software may be utilized as necessary in accordance with the present disclosure. In an embodiment as described herein, the automated liquid dispensing system may include at least an attachment sensor 1202 (e.g., a single- or multi-attachment sensor for engagement of the attachment portion with the interior surface of the bottle), one or more fluid sensors 1208, one or more additional sensors 1210 (e.g., motion sensors, temperature sensors, additional flow sensors, microphones, pressure sensors, etc.), processing circuitry 1204, memory 1206, a battery 1212, a user interface 1214, and communication circuitry 1216.

Processing circuitry 1204 may include one or more components providing necessary processing based on the requirements of the automated liquid dispensing system 1200. In some embodiments, processing circuitry 1204 may include hardware control logic and/or a one or more microprocessors. The processing circuitry 1204 may include suitable hardware and/or software logic necessary to interface with and control the hardware and other components of the automated liquid dispensing attachment, such as a hardware configured according to a hardware description language and/or instructions executing on a microprocessor or other circuitry capable of executing instructions. For example, processing circuitry may include a general- or special-purpose microprocessor, finite state machine, controller, computer, central-processing unit (CPU), field-programmable gate array (FPGA), or digital signal processor. Processing circuitry 1204 may run software to perform the operations described herein, including software accessed in machine-readable form on a tangible non-transitory computer-readable storage medium (e.g., flash, RAM, ROM, SRAM, EEPROM, hard drives, etc.) such as memory 1206, as well as software that describes the configuration of hardware such as hardware description language (HDL) software used for designing chips.

Attachment sensors 1202 may include attachment sensors as described herein, e.g., snap domes located at locations under attachment ribs of an attachment portion that deflect in response to a compressive force applied to the attachment ribs by insertion of the automated liquid dispensing device into a bottle. In other embodiments, other forms of attachment sensors 1202 may be used to replace or supplement the snap-dome type sensors, including other sensor types that respond to the compressive force applied to the attachment ribs (e.g., pressure sensors, proximity sensors, IR sensors, etc.) and/or sensors that respond to other forces and or stimuli, such as a snap dome, membrane switch, strain gauge, mechanical switch, capacitive sensor, button, or proximity sensor that senses the attachment of the upper opening of the bottle to the seating surface of the attachment portion. As described herein, the signal(s) from the attachment sensors are provided (e.g., by a wired connection to the flex PCB including the processing circuitry) to the processing circuitry for processing, e.g., as an input for opening and closing the pinch tube to allow or prevent the flow of fluid.

Fluid sensors 1208 may include fluid sensors as described herein, e.g., a capacitive sensor that senses changes in capacitance associated with fluid within a fluid passage of the automated liquid dispensing device. In other embodiments, other forms of fluid sensors 1208 may be used to replace or supplement the capacitive type sensor, including other sensor types that respond to the presence and or flow of liquid through portions of the fluid passage of the automated liquid dispensing device (e.g., proximity sensors, IR sensors, resistive sensors, ultrasonic sensors, hall effect sensors, resistance meters, optical sensors, flow meters, etc.). As described herein, the signal(s) from the fluid sensor(s) are provided (e.g., by a wired connection to the flex PCB including the processing circuitry) to the processing circuitry for processing, e.g., as an input for opening and closing the pinch tube to allow or prevent the flow of fluid, or to control the degree of the pinch tube opening or closing to control a flow rate through the automated liquid dispensing device.

Other sensors 1210 may include a variety of sensors to measure other relevant characteristics of the bottle, automated liquid dispensing device, and/or environment as described herein. One exemplary type of other sensor 1210 may be a motion sensor, such as accelerometers, gyroscopes, and/or shock sensors. Such sensors can monitor the movement of the liquid dispensing device, for example, to prevent fluid flow when the automated liquid dispensing device is attached to a bottle (e.g., according to the attachment sensors 1202) and is moving in an irregular manner. Motion sensors may also indirectly sense bottle attachment and other motions of interest (e.g., related to tampering or theft) based on patterns of movement. Another exemplary type of other sensor 1210 may be environmental sensors such as temperature or humidity sensors, which may identify conditions where it is inappropriate to pour and/or store from a bottle. For example, such conditions may be inputs that may be used to determine need for bottle movement or replacement. In some embodiments, aspects of other circuitry such as communication circuitry may be used to form other sensing functions. For example, measurements of wireless signal strength (e.g., Bluetooth low energy received signal strength indicator or RSSI measurements) may be used to identify employee proximity based on employee tags or mobile devices. This information may be used as an input to activate or disable pouring, provide notifications to the user, monitor theft, or perform other similar functions. Another exemplary type of other sensor 1210 may be a sensor (e.g., particulate, IR, proximity, etc.) that senses blockage of the spout, which may identify conditions where the spout needs to be serviced. Another exemplary type of other sensor 1210 may measure characteristics of the motor such as voltage sensor, current sensor, impedance sensor, etc. In some embodiments, the opening and closing of the pinch tube may be measured directly, for example, by proximity sensors, IR sensors, or other suitable sensors measuring the location of adjacent portions of the pinch tube or the location of the pinching extension. Other options include measuring pressure differentials and/or the presence/flow of fluid within different portions of the fluid passage. As described herein, the signal(s) from the other sensor(s) are provided (e.g., by a wired connection to the flex PCB including the processing circuitry) to the processing circuitry for processing.

Battery 1212 may be a suitable battery type such as a rechargeable lithium ion battery, although in some embodiments (not depicted herein) an enclosed battery compartment may be provided for receiving replaceable batteries. Whatever type of battery is used, the battery provides power necessary to operate the other components of the automated liquid dispensing attachment. In some embodiments, a variety of battery saving measures may be employed, such as low power or sleep modes where only limited subsets of components are activated, such as an accelerometer that senses movement to wake up other components, or a communication interface that periodically wakes up to search for an instruction to permit pouring or identify the presence of an authorized employee.

Although a user interface may include particular user interface components (e.g., one or more buttons and LEDs) as described in detail herein, it will be understood that a variety of user interface 1214 types and methodologies may be employed in accordance with the present disclosure. For example, a miniaturized touch screen display can provide for configurable user inputs and outputs, that may be updated dynamically to employ new functionality. Other types of interface methodologies may be employed as a substitute for or in addition to the touch and display techniques, such as audible warnings, haptic patterns, and/or remote UI performed by auxiliary devices such as adjacent displays (e.g., of smart watches, wearable devices, inventory management or POS systems, smart phones, tablets, etc.) or AR devices.

Communication circuitry 1216 may include wireless and/or wired circuitry for communicating with other devices. Exemplary wireless interfaces (e.g., BLE, WiFi, NFC, infrared, Low Power Wide-Area Network, etc.) may provide for local communications, reporting of data, receiving of control instructions, software updates, identification of authorized users, and other functionality as described herein. An exemplary wired communication may include a connector that attaches to other systems such as a charger for bulk data exchange functions, such as data downloads and software updates. In some embodiments, only certain devices may operate as communications hubs or collectors (e.g., utilizing protocols such as Thread or Bluetooth mesh protocols) for communicating with other devices, allowing many of the of the automated liquid dispensing devices to have more limited battery usage, storage, and processing hardware and software requirements.

Figure 13:
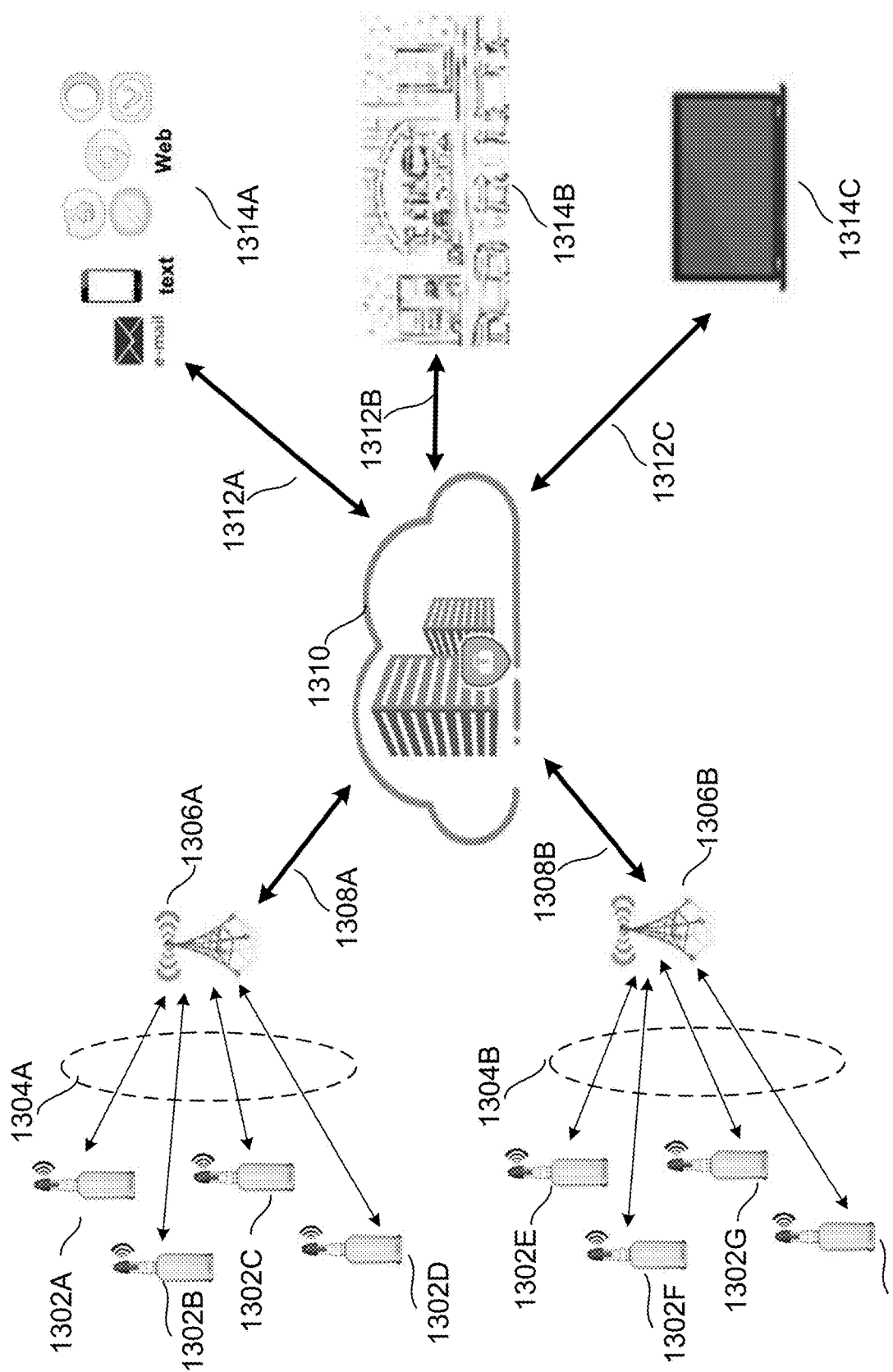
FIG. 13 depicts an exemplary IoT enabled automated liquid dispensing system in accordance with at least some embodiments of the present disclosure.

FIG. 13 depicts an exemplary IoT enabled automated liquid dispensing system in accordance with at least some embodiments of the present disclosure. In an embodiment of the present disclosure, the communication circuitry of some or all of the automated liquid dispensing attachments 1302 (e.g., 1302A-1302H) may utilize long-range integrated radio circuitry such as a Low Power Wide-Area Network (LPWA) (e.g., LoRAWAN, Sigfox, Symphony Link, or Link Labs Open Source Communication Protocol). In this manner, long-range communications channels 1304 (e.g., 1304A-1304B) with long-range network gateway transponders 1306 (e.g., 1306A-1306B) enable direct monitoring and control via a cloud system 1310. Utilizing a long-range network may ease the setup and provide for significantly improved range, for example, in large venues such as arenas, outdoor concert venues, bar and restaurant patios, as well as pop-up events such as concerts, farmers markets, food trucks, and ghost kitchen food courts. A long-range network may provide increased range and reliability as compared to other technologies such as WiFi (e.g., having limited range and being dependent on other networks for data backhaul) and cellular technologies that have difficulty reaching many indoor spaces and locations. The long-range network may avoid problems such as slow or no access in certain establishments, devices that cannot connect with the network, connections dropping at random times, wireless network disappearing completely, and poor signal quality at particular locations.

The improved long-term availability, reliability and long range transmission capability allow for critical control, monitoring and transmission of the IoT sensor data to the cloud without interference, without need to connect to the Wi-Fi or LTE networks, while using an independent and proprietary network, having the ability to scale through a combination of a cells-based topology and operation in non-interfered licensed spectrum bands. The long-range network may be designed for IoT devices while having high data integrity and network security allowing for embedding a wide range of sensors into the attachment to monitor fluid flow, beverage temperature, room humidity, amount of liquid, spillage, overpour in order to monitor the use, movement, status and functionality via real-time data transport. In addition, a long-range network such as an LPWA network is designed to send small dedicated data packages such that a plethora of sensors embedded within the automated liquid dispensing attachment can each send small individualized data packets. In some embodiments, as one sensor transmits fluid flow data, another may send beverage temperature, another may send beverage level in the bottle, another may send room humidity, and yet another may send amount of liquid spillage. This data may be sent in packages or asynchronously as received in different embodiments, for streaming to the cloud system 1310 via the long-range communication channels 1304A-1304B, long-range communication gateway transponders 1306A-1306B, and communication channels 1308A-1308B. In an exemplary embodiment of individualized small messages, the cloud system 1310 may combine these messages to provide complete picture of the automated liquid dispensing devices and environment. In some embodiments (not depicted in FIG. 13), a subset of the automated liquid dispensing attachments (e.g., 1302A-1302H) may utilize a short-range communications protocol (e.g., Bluetooth low energy, mesh, etc.) to communication with long-range communication enabled liquid dispensing attachments, which in turn relay messages to and from the cloud. The cloud system may communicate with other systems such as user mobile devices and AR systems 1314A, an establishment POS system 1314B, and inventory and operations management systems 1314C via conventional communication networks 1312A-1312C.

In an embodiment of the present disclosure, this method of collecting and transmitting critical operational data from the attachments allows establishments and distributors to analyze the consumption patterns on a real-time, day by day, week by week and over longer periods and tailor their buying patterns and allow for better control over their bar operations, inventory and order management process. In addition, these sensors can detect spillage and allow for implementation of loss prevention strategies for the owner or establishment in real time. Further these sensors can communicate when the attachment portion that is engaged with the interior portion of the container has started to show wear and tear beyond a specified value allowing for proactive preventative replacement thereby allowing for the operations of the bar to continue unimpeded. This is especially advantageous for large operations where thousands of liquor bottles can be employed at any particular time and it becomes very labor intensive to monitor and examine every single drink dispenser attachment in order to ensure that the bar operations are not impacted when an unexpected failure occurs.

Figure 14:
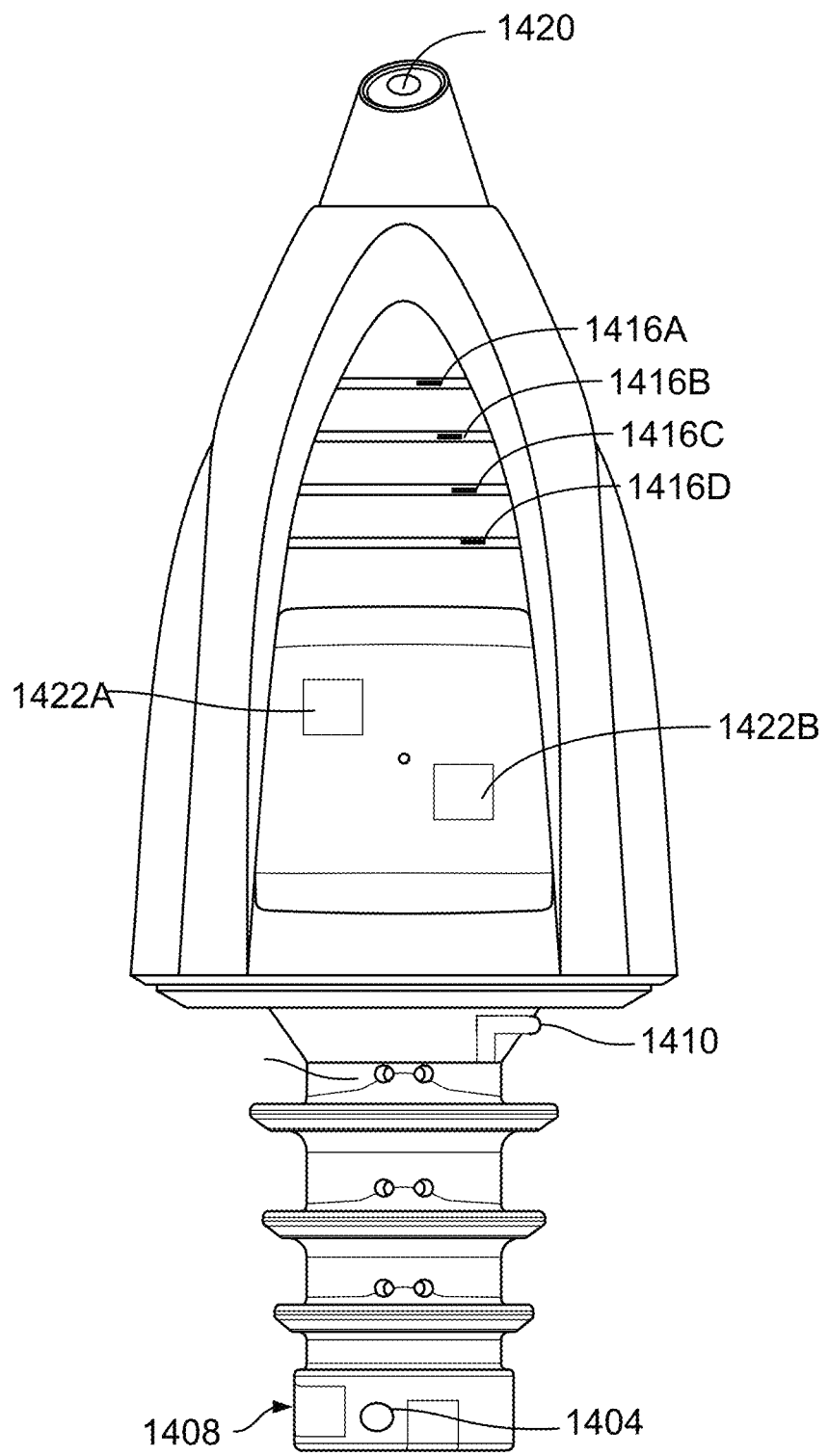
FIG. 14 depicts an automated liquid dispensing attachment with an exemplary sensor configuration in accordance with some embodiments of the present disclosure.

FIG. 14 depicts an automated liquid dispensing attachment with an exemplary sensor configuration in accordance with some embodiments of the present disclosure. In addition to other sensors and interfaces described in particular embodiments herein such as attachment sensors, fluid sensors, motion sensors, temperatures sensors, and user interfaces, FIG. 14 depicts additional sensors such as laminar flow sensor 1404, force sensor 1408, air flow sensor 1410, optical sensors 1416A-D, secondary flow sensor 1420, and haptic sensors 1422-1422B. It will be understood that the particular combination of sensors depicted and described with respect to FIG. 14 is exemplary, and that other sensor types and combinations may be implemented in other embodiments.

An exemplary laminar flow sensor 1404 may be located adjacent to the fluid passage, and may measure the characteristics of the fluid flow (e.g., a Reynolds number criterion). This measurement may be used in a variety manner, such as to control aspects of the pour (e.g., required pour angle and degree of pinch tube opening) to allow for better and more consistent flow. An exemplary pressure sensor 1408 may be located at location where the automated liquid dispensing attachment is inserted into a bottle, for example, to identify an initial insertion and monitor and prevent tampering. An exemplary flow sensor 1410 may measure characteristics within the air passage between the breather tube and external environment, for example, to identify errors in breather tube attachment and air flow problems indicative of a need for preventative maintenance or other remedial action. Exemplary optical sensor 1416A-D may measure received light signals including from the external from the attachment as well as from the LEDs, providing for feedback to identify errors in provided user outputs and to adjust the light outputs for particular environments (e.g., to enable power and energy savings). Exemplary secondary flow sensor 1420 may be located adjacent to the opening of the spout to provide feedback to the system regarding expected flow from the spout. If fluid is not present in an expected amount and/or with an expected flow rate, feedback may be provided to take corrective action (e.g., adjust the applied pressure to the pinch tube) and/or provide error reporting or preventative maintenance instructions. Exemplary touch and haptic sensors 1422 may strategically located to provide a user with alternative locations for providing respective user inputs and combination of user inputs via a direct touch interface.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. An automated liquid dispensing attachment, comprising:
   an attachment body configured to engage with an interior surface of a container at an outer circumference of the attachment body, the outer circumference of the attachment body disposed within the container;
   a bottle seat attached to the attachment body above the attachment body, wherein the bottle seat is configured to engage with an upper surface of an opening of the container at a lower surface of the bottle seat, the lower surface of the bottle seat positioned above the outer circumference of the attachment body and disposed outside the container;

a fluid passage extending through the attachment body;

a fluid sensor coupled between an external surface of the attachment body along the outer circumference and an external diameter of the fluid passage, the fluid sensor located entirely within the attachment body such that the fluid sensor is positioned below the bottle seat and within the container when the attachment body is inserted into the container, the fluid sensor configured to output a fluid signal based on a fluid within the fluid passage;

a fluid control device configured to selectively permit fluid to pass through the fluid passage; and processing circuitry coupled to receive the fluid signal, wherein the processing circuitry is configured to control the fluid control device based on the fluid signal.

2. The automated liquid dispensing attachment of claim 1, wherein the fluid sensor is directly attached to an interior surface of the attachment body.

3. The automated liquid dispensing attachment of claim 1, further comprising a lower interior housing assembly member surrounding the fluid passage, wherein the attachment body substantially surrounds the fluid sensor and wherein the fluid sensor is located adjacent to an external surface of the lower interior housing assembly.

4. The automated liquid dispensing attachment of claim 3, wherein the lower interior housing assembly comprises a cylindrical member, and wherein the fluid sensor is located adjacent to the cylindrical member.

5. The automated liquid dispensing attachment of claim 3, wherein the fluid sensor substantially surrounds at least a portion of the fluid passage and the lower interior housing.

6. The automated liquid dispensing attachment of claim 1, wherein the fluid sensor comprises a capacitive sensor.

7. The automated liquid dispensing attachment of claim 6, wherein the fluid sensor at least partially surrounds the fluid passage within the attachment body.

8. The automated liquid dispensing attachment of claim 6, wherein the capacitive sensor comprises electrical traces that collectively register a change in capacitance when in proximity to liquid passing through the fluid passage.

9. The automated liquid dispensing attachment of claim 8, wherein the electrical traces that wrap around a circumference of the fluid passage.

10. The automated liquid dispensing attachment of claim 8, further comprising a tapered portion defining a tapering surface extending between the attachment body and the bottle seat.

11. The automated liquid dispensing attachment of claim 10, further comprising a breather tube located within the attachment body adjacent to the fluid passage, wherein the tapering surface defines a breather tube outlet in fluid communication with the breather tube.

12. The automated liquid dispensing attachment of claim 6, wherein the processing circuitry is configured to determine a flow rate from the fluid signal.

13. The automated liquid dispensing attachment of claim 12, wherein the flow rate is based on output patterns of the capacitive sensor.

14. The automated liquid dispensing attachment of claim 6, wherein the fluid sensor is tuned for suitability of sensing of particular fluids.

15. The automated liquid dispensing attachment of claim 6, wherein the fluid signal is based on the absolute amplitude, frequency, or peak-to-trough amplitude of the capacitive sensor.

16. The automated liquid dispensing attachment of claim 1, wherein the fluid sensor comprises one of a proximity sensor, an IR sensor, a resistive sensor, an ultrasonic sensor, a hall effect sensor, a resistance meter, an optical sensor, or a flow meter.

17. The automated liquid dispensing attachment of claim 1, further comprising wireless communication circuitry coupled to the processing circuitry, wherein the processing circuitry is configured to transmit an error message via the wireless communication circuitry based on the fluid signal.

18. The automated liquid dispensing attachment of claim 17, further comprising one or more motion sensors configured to output one or more motion signals, wherein the processing circuitry is configured to transmit an error message via the wireless communication circuitry based on the fluid signal and the one or more motion signals.

19. The automated liquid dispensing attachment of claim 17, further comprising a timer, wherein the processing circuitry is configured to transmit an error message via the wireless communication circuitry based on the fluid signal and the timer.

20. The automated liquid dispensing attachment of claim 17, further comprising one or more environmental sensors configured to output one or more environmental signals, wherein the processing circuitry is configured to transmit an error message via the wireless communication circuitry based on the fluid signal and the one or more environmental signals.

21. An automated liquid dispensing attachment, comprising:

an attachment body configured to engage with an interior surface of a container at an outer circumference of the attachment body, the outer circumference of the attachment body disposed within the container;

a bottle seat attached to the attachment body above the attachment body, wherein the bottle seat is configured to engage with an upper surface of an opening of the container at a lower surface of the bottle seat, the lower surface of the bottle seat positioned above the outer circumference of the attachment body and disposed outside the container;

a housing coupled to the bottle seat and configured to be located outside of the container when the attachment body and bottle seat are engaged with the interior surface of the container;

a spout extending from the housing;

a fluid passage connected to the spout and extending through the attachment body and the housing;

a fluid sensor coupled between an external surface of the attachment body along the outer circumference and an external diameter of the fluid passage, the fluid sensor located entirely within the attachment body such that the fluid sensor is positioned below the bottle seat and within the container when the attachment body is inserted into the container, the fluid sensor configured to output a fluid signal based on a fluid within the fluid passage;

a fluid control device coupled to the fluid passage to selectively permit fluid to pass through the fluid passage to an opening of the spout; and processing circuitry coupled to receive the fluid signal, wherein the processing circuitry is configured to control the fluid control device based on the fluid signal.

22. An automated liquid dispensing attachment, comprising:
- an attachment body configured to engage with an interior surface of a container at an outer circumference of the attachment body, the outer circumference of the attachment body disposed within the container;
- a bottle seat attached to the attachment body above the attachment body, wherein the bottle seat is configured to engage with an upper surface of an opening of the container at a lower surface of the bottle seat, the lower surface of the bottle seat positioned above the outer circumference of the attachment body and disposed outside the container;
- a fluid passage extending through the attachment body;
- a fluid sensor located proximate to a portion of the fluid passage along the outer circumference and configured to output a fluid signal based on a liquid within the portion of the fluid passage, the fluid sensor located entirely within the attachment body such that the fluid sensor is positioned below the bottle seat and within the container when the attachment body is inserted into the container, wherein the fluid sensor comprises a capacitive sensor, and wherein the fluid sensor at least partially surrounds the fluid passage within the attachment body;
- wireless communication circuitry; and
- processing circuitry coupled to the wireless communication circuitry and to receive the fluid signal, wherein the processing circuitry is configured to transmit an error message via the wireless communication circuitry based on the fluid signal.

* * * * *